US007769477B2

(12) United States Patent
Geyersberger et al.

(10) Patent No.: US 7,769,477 B2
(45) Date of Patent: Aug. 3, 2010

(54) AUDIO FILE FORMAT CONVERSION

(75) Inventors: Stefan Geyersberger, Wuerzburg (DE); Harald Gernhardt, Lauf (DE); Bernhard Grill, Lauf (DE); Michael Haertl, Buch am Erlbach (DE); Johann Hilpert, Herrnhuettestr (DE); Manfred Lutzky, Nuremberg (DE); Martin Weishart, Fuerth (DE); Harald Popp, Tuchenbach (DE)

(73) Assignee: Fraunhofer—Gesellschaft zur Forderung der Angewandten Forschung E.V., Munich (DE)

( * ) Notice: Subject to any disclaimer, the term of this patent is extended or adjusted under 35 U.S.C. 154(b) by 1232 days.

(21) Appl. No.: 11/337,231

(22) Filed: Jan. 20, 2006

(65) Prior Publication Data

US 2006/0259168 A1 Nov. 16, 2006

Related U.S. Application Data

(63) Continuation of application No. PCT/EP2004/007744, filed on Jul. 13, 2004.

(30) Foreign Application Priority Data

Jul. 21, 2003 (DE) ................................ 103 33 071
Aug. 27, 2003 (DE) ................................ 103 39 498

(51) Int. Cl.
*G06F 17/00* (2006.01)
*H04J 3/24* (2006.01)
*H04J 3/06* (2006.01)

(52) U.S. Cl. .......................... 700/94; 370/474; 370/511

(58) Field of Classification Search ................... 700/94; 704/500; 370/474, 509, 510, 395.64, 511
See application file for complete search history.

(56) References Cited

U.S. PATENT DOCUMENTS 5,642,338 A 6/1997 Fukushima et al.
5,724,391 A 3/1998 Takeuchi et al.

(Continued)

FOREIGN PATENT DOCUMENTS

EP 1 005 044 5/2000

(Continued)

OTHER PUBLICATIONS

International Standard; "Information Technology-Generic Coding of Audiovisual Objects; Part 3/SubPart 4"; May 15, 1998' pp. 1-169.

(Continued)

*Primary Examiner*—Vivian Chin
*Assistant Examiner*—Daniel R Sellers
(74) *Attorney, Agent, or Firm*—Thomas, Kayden, Horstemeyer & Risley, LLP

(57) ABSTRACT

The manipulation of audio data can be simplified, such as, for example, with regard to the combination of individual audio data streams to multi-channel audio data streams or the general manipulation of an audio data stream, by modifying a data block in an audio data stream divided into data blocks with determination block and data block audio data, such as by completing or adding or replacing part of the same, so that the same includes a length indicator indicating an amount or length of data, respectively, of the data block audio data or an amount or length of data, respectively, of the data block to obtain a second audio data stream with modified data blocks. Alternatively, an audio data stream with pointers in determination blocks, which point to determination block audio data associated to this determination blocks, but distributed among different data blocks, is converted into an audio data stream, wherein the determination block audio data are combined to contiguous determination block audio data. The contiguous determination block audio data can then be included in a self-contained channel element together with their determination block.

16 Claims, 8 Drawing Sheets

U.S. PATENT DOCUMENTS

| | | | | |
|---|---|---|---|---|
| 6,466,476 | B1 | 10/2002 | Wong et al. | |
| 7,107,111 | B2 * | 9/2006 | Van De Kerkhof et al. | 700/94 |
| 7,149,159 | B2 * | 12/2006 | Oomen et al. | 369/47.13 |
| 2002/0184622 | A1 | 12/2002 | Emura et al. | |
| 2003/0004708 | A1 * | 1/2003 | Oomen et al. | 704/200.1 |
| 2003/0009246 | A1 | 1/2003 | Van De Kerkhof et al. | |

FOREIGN PATENT DOCUMENTS

| | | |
|---|---|---|
| EP | 1 365 410 | 11/2003 |
| EP | 1 420 401 | 5/2004 |
| JP | 07 221716 | 8/1995 |
| WO | WO 02/086894 | 10/2002 |
| WO | WO 02/086896 | 10/2002 |
| WO | WO 03/005719 | 1/2003 |
| WO | WO 2005/013491 | 2/2005 |

OTHER PUBLICATIONS

International Standard; "Coding of Moving Pictures and Associated Audio;" Nov. 11, 1994; pp. 1-104.
International Standard; "Coding of Moving Pictures and Associated Audio for Digital Storage Media to about 1.5 Mbit/s;" Aug. 1, 1993; pp. 1-15.
R. Finlayson; "A More Loss-Tolerant RTP Payload Format for MP3 Audio;" wysiwyg://1//http://www.taqs.org/rtcs/rtc31; Jun. 2001; pp. 1-15.
International Preliminary Examination Report, Oct. 18, 2004, WIPO.
National German Examination Procedure, Jan. 27, 2005, Germany.
Supplementary Notice from WIPO, Nov. 24, 2005, WIPO.

* cited by examiner

AUDIO FILE FORMAT CONVERSION

CROSS-REFERENCE TO RELATED APPLICATION

This application is a continuation of copending International Application No. PCT/EP2004/007744, filed Jul. 13, 2004, which designated the United States and was not published in English.

BACKGROUND OF THE INVENTION

1. Field of the Invention

The present invention relates to audio data streams coding audio signals and, more specifically, to a better manipulation of audio data streams in a file format where the audio data associated to a time mark can be distributed among different data blocks, such as is the case in MP3 format.

2. Description of the related art

MPEG audio compression is a particularly effective way to store audio signals, such as music or the sound for a film, in digital form while requiring, on the one hand, as little memory space as possible and, on the other hand, maintaining the audio quality as good as possible. Over the last years, MPEG audio compression has proved to be one of the most successful solutions in this field.

Meanwhile, different versions of MPEG audio compression methods exist. Generally, the audio signal is sampled with a certain sample rate, the resulting sequence of audio samples being associated to overlapping time periods or time marks, respectively. These time marks are then individually supplied to, for example, a hybrid filter bank consisting of polyphase and a modified discrete cosine transform (MDCT), suppressing aliasing effects. The actual data compression takes place during quantization of the MDCT coefficients. The MDCT coefficients quantized in that way are then converted into a Huffman code of Huffman code words generating a further compression by associating shorter code words to more frequently occurring coefficients. Thus, overall, the MPEG compressions are lossy, the "audible" losses, however, being limited, since psychoacoustic knowledge has been incorporated in the way of quantizing the DCT coefficients.

A widely used MPEG standard is the so-called MP3 standard, as described in ISO/IEC 11172-3 and 13818-3. This standard allows an adaptation of the information loss generated by compression to the bit rate by which the audio information is to be transmitted in real time. The transmission of the compressed data signal in a channel with constant bit rate should also be performed in other MPEG standards. In order to ensure that the listening quality at the receiving decoder remains sufficient, even at low bit rates, the MP3 standard provides for an MP3 coder having a so-called bit reservoir. This means the following. Normally, due to the fixed bit rate, the MP3 coder should code every time mark into a block of code words having the same size, this block could then be transmitted with given bit rate in the time period of the time period repetition rate. However, this would not accommodate the case that some parts of an audio signal, such as the sounds following a very loud sound in a piece of music, require less exact quantization with constant quality compared to other parts of the audio signal, such as parts with a plurality of different instruments. Thus, an MP3 coder does not generate a simple bit stream format where every time mark is coded in one frame with the same frame length for all frames. Such a self-contained frame would consist of a frame header, side information and main data associated to the time mark associated to the frame, namely the coded MDCT coefficients, wherein the side information is information for the decoder how the DCT coefficients are to be decoded, such as how many subsequent DCT coefficients are 0, for indicating which DCT coefficients are successively included in the main data. Rather, a backpointer is included in the side information or in the header, pointing to a position within the main data in one of the previous frames. This position is the beginning of the main data pertaining to the time mark to which the frame is associated wherein the corresponding backpointer is included. The backpointer indicates, for example, the number of bites by which the beginning of the main data is offset in the bit stream. The end of these main data can be in any frame, depending on how high the compression rate for this time mark is. The length of the main data of the individual time marks is thus no longer constant. Thus, the number of bits by which a block is coded can be adapted to the properties of the signal. At the same time, a constant bit rate can be achieved. This technique is called "bit reservoir". Generally, the bit reservoir is a buffer of bits, which can be used to provide more bits for coding a block of time samples than would generally be allowed by the constant output data rate. The technique of bit reservoir accommodates the fact that some blocks of audio samples can be coded with less bits than specified by the constant transmission rate, so that these blocks fill the bit reservoir, while other blocks of audio samples have psychoacoustic properties that do not allow such a high compression, so that the available bits would actually not be sufficient for low-interference or interference-free decoding, respectively, of these blocks. The required excessive bits are taken from the bit reservoir, so that the bit reservoir empties during such blocks. The technique of the bit reservoir is also described in the above-indicated standard MPEG layer 3.

Although the MP3 format does have advantages on the coder side by providing the backpointers, there are undeniable disadvantages on the decoder side. If, for example, a decoder receives an MP3 bit stream not from the beginning but starting from a certain frame in the middle, the coded audio signal at the time mark associated to this frame can only be played instantly when the backpointer is incidentally 0, which would indicate that the beginning of the main data to this frame is incidentally immediately after the header or side information, respectively. However, this is normally not the case. Thus, playing the audio signal at this time mark is not possible when the backpointer of the frame that was received first points to a previous frame, which, however, has not (yet) been received. In that case, (at first) only the next frame can be played.

Further problems occur on the receiver side when dealing with the frames in general, which are interconnected by the backpointers and are thus not self-contained. A further problem of bit streams with return addresses for a bit reservoir is that, when different channels of an audio signal are individually MP3 coded, main data pertaining to each other in the two bit streams since they are associated to the same time mark, might be offset to each other, and with variable offset across the sequence of frames, so that here again combining these individual MP3 streams into a multi-channel audio data stream is impeded.

Additionally, there is a need for a simple possibility for generating easily manageable MP3-compliant multi-channel audio data streams. Multi-channel MP3 audio data streams according to ISO/IEC standard 13818-3 require matrix operations for retrieving the input channels from the transmitted channels on the decoder side and the usage of several backpointers and are thus complicated to manipulate.

MPEG 1/2 1/2 layer 2 audio data streams correspond to the MP3 audio data streams in their composition of subsequent frames and in the structure and arrangement of the frames, namely the structure of header, side information and main data part, and the arrangement with a quasi statical frame distance depending on the sample rate and the bit rate variable from frame to frame, however, they differ from the same by the lack of backpointers or bit reservoir, respectively, during coding. Coding-expensive and inexpensive time periods of the audio signal are coded with the same frame length. The main data pertaining to a time mark are in the respective frame together with the respective header.

US 2003/009246 A1 describes a trick playing and/or editing apparatus, which allows to edit MP3 data streams in a simpler way. After reading-in an MP3 file into a MP3 provider, it is proposed to convert the file in a converter such that an intermediate MP3 stream results, wherein the frame data to a frame each immediately follow the respective determination block, so that the back pointers are 0. During conversion, first, for a certain frame, the corresponding determination block is read out from the original MP3 file stream, and in the same the bitrate is set to a maximum possible value or a minimum possible value by considering the resulting frame length in the intermediate MP3 stream. Further, the padding bit is set or not set, depending on how it is required in the resulting intermediate MP3 stream with self-contained frames. Other fields in the frame headers are not altered. Obviously, the back pointer value is set to 0. Then, the frame data for the respective current frame are read out from the MP3 original data stream and added to the newly generated determination block, and then fill information are added to the frame payload data to set the length of the resulting self-contained frame to the one determined by the altered bitrate. The resulting intermediate MP3 data stream is then supplied to a trick playing and/or editing unit that can perform simple manipulations on the same, since the frames are now self contained. The intermediate PM3 data stream altered in that way is passed on to a common MP3 decoder.

In Finlayson R. "A more loss tolerant RTP payload format for MP3 audio", June 2001, URL: http.//www.faqs.org/rfcs/rfc3119.html", a conversion of an MP3 data stream into a real-time protocol payload data format, short RTP format, is described, which is better suited in the case of packet loss. Within this conversion, the MP3 frames become MP3 application data units, short ADU frames. An ADU descriptor precedes every ADU frame. An ADU frame differs from the original MP3 frame in that the full sequence of coded audio files and any other random data for the ADU, i.e. those beginning in the original MP3 data stream at the position to which the back pointer points, which is included in the corresponding original MP3 frame header, and ending at the next position to which the back pointer in the next MP3 frame points, which are included in the same ADU frame. Otherwise, the ADU frames self-contained in such a way differ from the original MP3 frames merely in the optional replacement of the first 11 synchronization bits in the MP3 frame header by a connectivity sequence number provided to selectively enable to re-sort the sequence of ADU frames for transmission in deviation from the original time sequence. The ADU descriptors added to the ADU frames formed in that way contain three fields, namely a continuation flag, a descriptor type flag and an ADU size indication indicating the size of the ADU frame following the respective ADU descriptor. These pairs of ADU frame and ADU descriptor are packed into RTP packets having RTP headers. If such a pair of ADU frame and ADU descriptor does not fit into such a packet, it is distributed among two subsequent RTP packets. In that case, the continuation flag is set in the ADU descriptor of the following ADU frame. The descriptor type flag only indicates how many bits the ADU size indication in the ADU descriptor includes. The RTP header fields comprise, among others, a time mark indication indicating the replay time of the first ADU packed into the respective packet. This RTP packet data stream with possibly interleaved ADU frame could then again be easily converted into a common MP3 data stream, namely the original MP3 data stream.

SUMMARY OF THE INVENTION

It is an object of the present invention to provide a scheme for converting an audio data stream into a further audio data stream or vice versa, so that the manipulation with the audio data is made easier, such as with regard to combining individual audio data streams into multi-channel audio data streams or the manipulation of an audio data stream in general.

In accordance with a first aspect, the present invention provides a method for converting a first audio data stream representing a coded audio signal comprising time periods and having a first file format into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, wherein determination block audio data are associated to the determination block, which are obtained by coding a time period, wherein the determination block comprises a pointer pointing to a beginning of the determination block audio data, and wherein and end of the determination block audio data lies prior to a beginning of determination block audio data in the audio data stream associated to a next data block, having the steps of: combining the determination block audio data associated to a determination block of at least two data blocks to obtain contiguous determination block audio data forming part of the second audio data stream, adding the contiguous determination block audio data to the determination block to which the determination block audio data are associated, from which the contiguous determination block audio data are obtained, to obtain a channel element; arranging the channel elements to obtain the second audio data stream; and modifying the channel element so that the same includes a length indication indicating the amount of data of the channel element or an amount of data of the contiguous determination block audio data, wherein the step of modifying comprises replacing a redundant part identical for all determination blocks by the length indication.

In accordance with a second aspect, the present invention provides a method for combining a first audio data stream representing a coded first audio signal and a second audio data stream representing a coded second audio signal into a multichannel audio data stream, having the steps of: converting the first audio data stream into a first sub-audio data stream according to the methods according to the first, third and fourth aspects; and converting the second audio data stream into a second sub-audio data stream according to the methods according to the first, third and fourth aspects, wherein the steps of arranging are performed such that the two sub-audio data streams together form the multi channel audio data stream, and that in the multi channel audio data stream the channel elements of the first sub-audio data stream and the channel elements of the second sub-audio data stream containing contiguous determination block audio data obtained by coding time periods equal in time are arranged successively in a contiguous access unit.

In accordance with a third aspect, the present invention provides a method for converting a first audio data stream representing a coded audio signal comprising time periods and having a first file format, into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, having the step of: modifying the data blocks so that the same include a length indication indicating the amount of data of the data blocks or an amount of data of the data block audio data to obtain channel elements forming the second audio data stream from the data blocks, wherein the step of modifying includes replacing a redundant part identical for all determination blocks by the length indication.

In accordance with a fourth aspect, the present invention provides a method for decoding a second audio data stream representing a coded audio signal comprising time periods and having a second file format, based on a decoder, which is able to decode a first audio data stream representing the coded signal and having a first file format, into an audio signal, wherein a time period comprises a number of audio values, and wherein according to the first file format, the first audio data stream is divided into successive data blocks, wherein a data block has a determination block and data block audio data, wherein determination block audio data, which are obtained by coding a time period, are associated to the determination block, wherein the determination block includes a pointer pointing to a beginning of the determination block audio data, and wherein an end of the determination block audio data is prior to a beginning of determination block audio data in the audio data stream associated to a next data block, and wherein the second audio data stream is divided into channel elements according to the second file format, wherein a channel element comprises contiguous determination block audio data obtained by combining determination block audio data associated to a determination block from two data blocks, and the associated determination block in a form wherein a previously redundant part, which is identical for al determination blocks, is modified to be replaced by a length indication indicating the amount of data of the respective channel element or an amount of data of the respective contiguous determination block data, having the steps of forming an input data stream representing the coded audio signal and having a first file format, from the second audio data stream by parsing the second audio data stream by using the length indications; resetting the pointers in the determination blocks of the channel elements of the second audio data stream, so that the same indicate as a beginning of the determination block audio data that the determination block audio data begin immediately after the respective determination block to obtain reset determination blocks; changing a bit rate indication in the determination blocks of the channel elements of the second audio data stream so that a data block length depending on the bit rate indication according to the second audio file format is sufficient to take up the respective determination block and the associated determination block audio data to obtain bit rate-changed and reset determination blocks; and inserting bits between every channel element and the subsequent channel element, so that the length of every channel element plus the inserted bits is adapted to the changed bit rate indication, and supplying the input data stream to the decoder according to the changed bit rate indication to obtain the audio signal.

In accordance with a fifth aspect, the present invention provides an apparatus for converting a first audio data stream representing a coded audio signal comprising time periods and having a first file format, into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, wherein determination block audio data are associated to the determination block, which are obtained by coding a time period, wherein the determination block comprises a pointer pointing to a beginning of the determination block audio data, and wherein and end of the determination block audio data lies prior to a beginning of determination block audio data in the audio data stream associated to a next data block, having: a means for combining the determination block audio data associated to a determination block of two data blocks to obtain contiguous determination block audio data forming part of the second audio data stream; a means for adding the contiguous determination block audio data to the determination block to which the determination block audio data are associated, from which the contiguous determination block audio data are obtained, to obtain a channel element; a means for arranging the channel elements to obtain the second audio data stream; and a means for modifying the channel element, so that the same includes a length indication indicating the amount of data of the channel element or the amount of data of the contiguous determination block audio data, wherein the means for modifying is formed to replace a redundant part, which is identical for all determination blocks, by the length indication.

In accordance with a sixth aspect, the present invention provides an apparatus for converting a first audio data stream representing a coded audio signal comprising time periods and having a first file format, into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, having a means for modifying the data blocks so that the same include a length indication indicating the amount of data of the data blocks or an amount of data of the data block audio data to obtain channel elements forming the second audio data stream from the data blocks, wherein the step of modifying includes replacing a redundant part, which is identical for all determination blocks, by the length indication.

In accordance with a seventh aspect, the present invention provides an apparatus for decoding a second audio data stream representing a coded audio signal comprising time periods and having a second file format, based on a decoder, which is able to decode a first audio data stream representing the coded signal and having a first file format, into an audio signal, wherein a time period comprises a number of audio values, and wherein according to the first file format, the first audio data stream is divided into successive data blocks, wherein a data block has a determination block and data block audio data, wherein determination block audio data, which are obtained by coding a time period, are associated to the determination block, wherein the determination block includes a pointer pointing to a beginning of the determination block audio data, and wherein an end of the determination block audio data is prior to a beginning of determination block audio data in the audio data stream associated to a next data block, and wherein the second audio data stream is divided into channel elements according to the second file format, wherein a channel element comprises contiguous determination block audio data obtained by combining determination block audio data associated to a determination block from two data blocks, and the associated determination block, in a form wherein a previously redundant part, which is identical for al determination blocks, is modified to be replaced by a length indication indicating the amount of data of the respective channel element or an amount of data of the respective contiguous determination block data having: a means for forming an input data stream representing the coded audio signal and having a first file format, from the second audio data stream by parsing the second audio data stream by using the length indications; resetting the pointers in the determination blocks of the channel elements of the second audio data stream, so that the same indicate as a beginning of the determination block audio data that the determination block audio data begin immediately after the respective determination block to obtain reset determination blocks; changing a bit rate indication in the determination blocks of the channel elements of the second audio data stream so that a data block length depending on the bit rate indication according to the second audio file format is sufficient to take up the respective determination block and the associated determination block audio data to obtain bit rate-changed and reset determination blocks; and inserting bits between every channel element and the subsequent channel element, so that the length of every channel element plus the inserted bits is adapted to the changed bit rate indication, and a means for supplying the input data stream to the decoder according to the changed bit rate indication to obtain the audio signal.

In accordance with an eighth aspect, the present invention provides a computer program with a program code for performing one of the above-mentioned methods when the computer program runs on a computer.

The manipulation of audio data can be simplified, such as, for example, with regard to the combination of individual audio data streams into multi-channel audio data streams or the general manipulation of an audio data stream, by modifying a data block in an audio data stream divided into data blocks with determination block and data block data, such as by completing or adding or replacing part of the same, so that the same includes a length indicator indicating an amount or length of data, respectively, of the data block audio data or an amount or length of data, respectively, of the data block, to obtain a second audio data stream with modified data blocks. Alternatively, an audio data stream with pointers in determination blocks, which point to determination block audio data associated to those determination blocks, but distributed among different data blocks, is converted into an audio data stream, wherein the determination block audio data are combined to contiguous determination block audio data. The contiguous determination block audio data can then be included in a self-contained channel element together with their determination block.

It is a finding of the present invention that a pointer-based audio data stream where a pointer points to the beginning of the determination block audio data of the respective data block is easier to handle when this audio data stream is manipulated so that all determination block audio data, i.e. audio data concerning the same time mark or coding the audio values for the same audio mark, are combined into a contiguous block of contiguous determination block audio data, and that the respective determination block, to which the contiguous determination block audio data are associated, is added to the same. After arranging or lining-up the same, respectively, the channel elements obtained that way result in the new audio data stream wherein all audio data pertaining to one time mark or coding the audio values or samples, respectively, for this time mark, are also combined in one channel element, so that the new audio data stream is easier to handle.

According to an embodiment of the present invention, every determination block or every channel element is modified in the new audio data stream, such as by adding or replacing a part to obtain a length indication indicating the length or amount of data, respectively, of the channel element of the contiguous audio data included therein, to ease decoding the new audio data stream with channel elements of variable length. Advantageously, modification is performed by replacing a redundant part of these determination blocks identical for all determination blocks of the input audio data stream by the respective length indication. This measure can achieve that the data bit rate of the resulting audio data stream is equal to the one of the original audio data stream despite the additional length indication compared to the original pointer-based audio data stream, and that thereby further the actually unnecessary backpointer in the new audio data stream can be obtained in order to be able to reconstruct the original audio data stream from the new audio data stream.

The identical redundant part of these determination blocks can be placed before the new resulting audio data stream in an overall determination block. On the receiver side, the resulting second audio data stream can thus be reconverted into the original audio data stream in order to use existing decoders that can only decode audio data streams of the original file format for decoding the resulting audio data stream in the pointer-less format.

According to a further embodiment of the present invention, a conversion of a first audio data stream into a second audio data stream of another file format is used to form a multi-channel audio data stream of several audio data streams of the first file format. A receiver-side manageability is improved compared to the mere combination of the original audio data streams with pointer, since in the multi-channel audio data stream all channel elements pertaining to a time mark or containing the contiguous determination block audio data, respectively, were obtained by coding a simultaneous time period of a channel of a multi-channel audio signal, i.e. by coding time periods of different channels pertaining to the time mark, can be combined to access units. This is not possible with pointer-based audio data formats, since there the audio data for one time mark can be distributed among different data blocks. Providing data blocks in several audio data streams to different channels with a length indication allows better parsing by the access units during combination of the audio data streams to a multi-channel data stream with access units.

Further, the present invention resulted from the finding that it is very easy to reconvert the above-described resulting audio data streams into an original file format, which can then be decoded into the audio signal by existing decoders. While the resulting channel elements have a different length and are thus sometimes longer and sometimes shorter than the length available in the data block of the original audio data stream, it is not required to offset or combine the main data according to the eventually unnecessarily obtained backpointers for playing the audio data stream in a new file format, but it is sufficient to increase a bit rate indication in the determination blocks of the audio data stream of the original file format to be generated. The effect of this is that according to this bit rate indication, even the longest of the channel elements in the audio data stream to be decoded is smaller or the same as the data block length which the data blocks have in an audio data stream of the first file format. The backpointers are set to zero and the channel elements are increased to the length corresponding to the increased bit rate indication by adding bits of don't care values. Thus, data blocks of an audio data stream in original file format are generated, wherein the pertaining main data are merely included in the data block itself and not in any other one. An audio data stream of the first file format reconverted in that way can then be supplied to an existing decoder for audio data streams of the first file format by using the bit rate increased according to the increased bit indication. Thus, expensive shift operations for reconverting are omitted, as well as the requirement to replace existing decoders by new ones.

On the other hand, according to a further embodiment, it is possible to retrieve the original audio data stream from the resulting audio data stream by using the information included in the overall determination block of the resulting audio data stream across the identical redundant part of the determination blocks to retrieve the part overwritten by the length indication.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

The present invention will be discussed below with reference to the drawings based on embodiments where the original audio data stream in a file format where backpointers are used in the determination blocks of the data blocks for pointing to the beginning of main data pertaining to the determination block is merely exemplarily an MP3 audio data stream, while the resulting audio data stream consisting of self-contained channel elements where the audio data pertaining to the respective time mark are each combined, is also merely exemplarily an MPEG-4 audio data stream. The MP3 format is described in the standard ISO/IEC 11172-3 and 13818-3 cited in the background period, while the MPEG-4 file format is described in standard ISO/IEC 14496-3.

Figure 1:
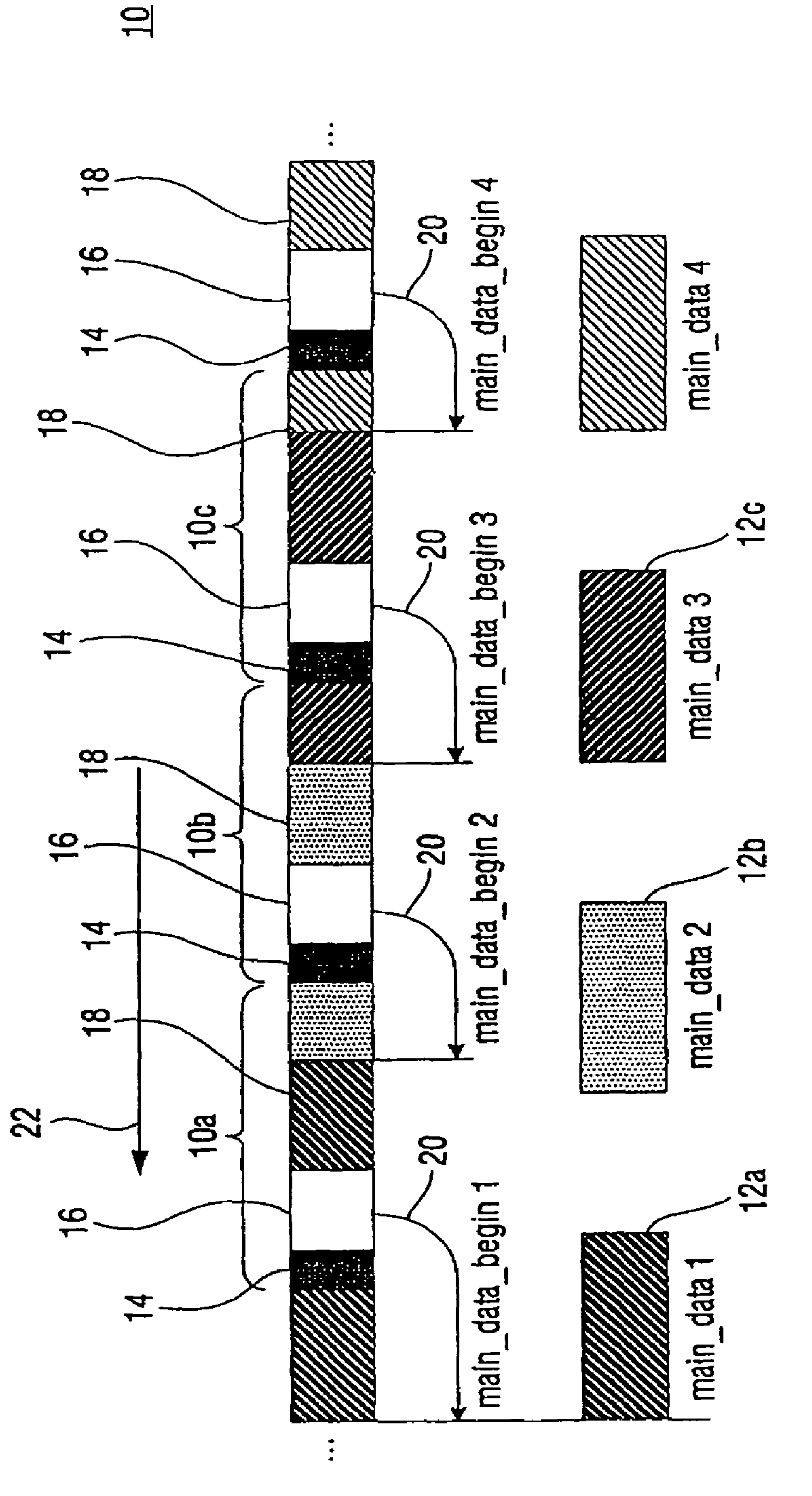
FIG. 1 is a schematical drawing for illustrating the MP3 file format with backpointer.

First, the MP3 format will be briefly discussed with reference to FIG. 1. FIG. 1 shows a portion of an MP3 audio data stream 10. The audio data stream 10 consists of a sequence of frames or data blocks, respectively, of which only three can be fully seen in FIG. 1, namely 10*a*, 10*b* and 10*c*. The MP3 audio data stream 10 has been generated by an MP3 coder from an audio or sound signal, respectively. The audio signal coded by the data stream 10 is, for example, music, noise, a mixture of the same and the like. The data blocks 10*a*, 10*b* and 10*c* are each associated to one of successive, possibly overlapping time periods into which the audio signal has been divided by the MP3 coder. Every time period corresponds to a time mark of the audio signal, and thus, in the description, the term time mark is often used for the time period. Every time period has been encoded into main data (main_data) by the MP3 coder individually by, for example, a hybrid filter bank consisting of a polyphase filter bank and a modified discrete cosine transform with subsequent entropy, such as Huffman, coding. The main data pertaining to the successive three time marks, to which the data blocks 10*a*-10*c* are associated, are illustrated in FIG. 1 by 12*a*, 12*b* and 12*c* as contiguous blocks aside from the actual audio data stream 10.

The data blocks 10*a*-10*c* of the audio data stream 10 are equidistantly arranged in the audio data stream 10. This means that every data block 10*a*-10*c* has the same data block length or frame length, respectively. The frame length, again, depends on the bit rate at which the audio data stream 10 is to be at least played in real time, and on the sample rate which the MP3 coder has used for sampling the audio signal prior to the actual coding. The connection is that the sample rate indicates in connection with the fixed number of samples per time mark how long a time mark is, and that it can be calculated from the bit rate and the time mark period how many bits can be transmitted in this time period.

Both parameters, i.e. bit rate and sample rate, are indicated in frame headers 14 in the data blocks 10*a*-10*c*. Thus, every data block 10*a*-10*c* has its own frame header 14. Generally, all information important for decoding the audio data stream are stored in every frame 10*a*-10*c* itself, so that a decoder can begin decoding in the middle of an MP3 audio data stream 10.

Apart from the frame header 14, which is at the beginning, every data block 10*a*-10*c* has a side information part 16 and a main data part 18 containing data block audio data. The side information part 16 immediately follows the header 14. The same includes information essential for the decoder of the audio data stream 10 for finding the main data or determination block audio data, respectively, associated to the respective data block, which are merely Huffman code words disposed linearly in series and to decode the same in a correct way to the DCT or MDCT coefficients, respectively. The main data part 18 forms the end of every data block.

As mentioned in the background section of the description, the MP3 standard supports a reservoir function. This is enabled by backpointers included in the side information within the side information part 16 indicated in FIG. 1 by 20. If a backpointer is set to 0, the main data for these side information begin immediately after the side information part 16. Otherwise, the pointer 20 (main_data_begin) indicates the beginning of the main data coding the time mark to which the data block is associated, wherein the side information 16 containing the backpointer 20 is included in a previous data block. In FIG. 1, for example, the data block 10*a* is associated to a time mark coded by the main data 12*a*. The backpointer 20 in the side information 16 of this data block 10*a* points, for example, to the beginning of the main data 12*a*, which is in a data block prior to the data block 10*a* in stream direction 22 by indicating a bit or byte offset measured from the beginning of the header 14 of the data block 16*a*. This means that at this time during coding of the audio signal, the bit reservoir of the MP3 coder generating the MP3 audio data stream 10 has not been full but could be loaded up to the height of the back-pointer. From the position, to which the backpointer 20 of the data block 10*a* points, onwards, the main data 12*a* are inserted in the audio data stream 10 with equidistantly disposed pairs of headers and side information 14, 16. In the present example, the main data 12*a* extend up to slightly over half of the main data part 18 of the data block 10*a*. The backpointer 20 in the side information part 16 of the subsequent 10*b* points to a position immediately after the main data 12*a* in the data block 10*a*. The same applies to the backpointer 20 in the side information part 16 of the data block 10*c*.

As can be seen, it is rather an exception in the MP3 audio data stream 10 when the main data pertaining to a time mark are actually exclusively in a data block associated to this time mark. Rather, the data blocks are mostly distributed among one or several data blocks, which might not even include the corresponding data block itself, depending on the size of the bit reservoir. The height of the backpointer value is limited by the size of the bit reservoir.

After the structure of an MP3 audio data stream has been described with regard to FIG. 1, an arrangement will be described with reference to FIG. 2, which is suitable to convert an MP3 audio data stream into an MPEG-4 audio data stream, or to obtain an MPEG-4 audio data stream from an audio signal, which can easily be converted into an MP3 format.

Figure 2:
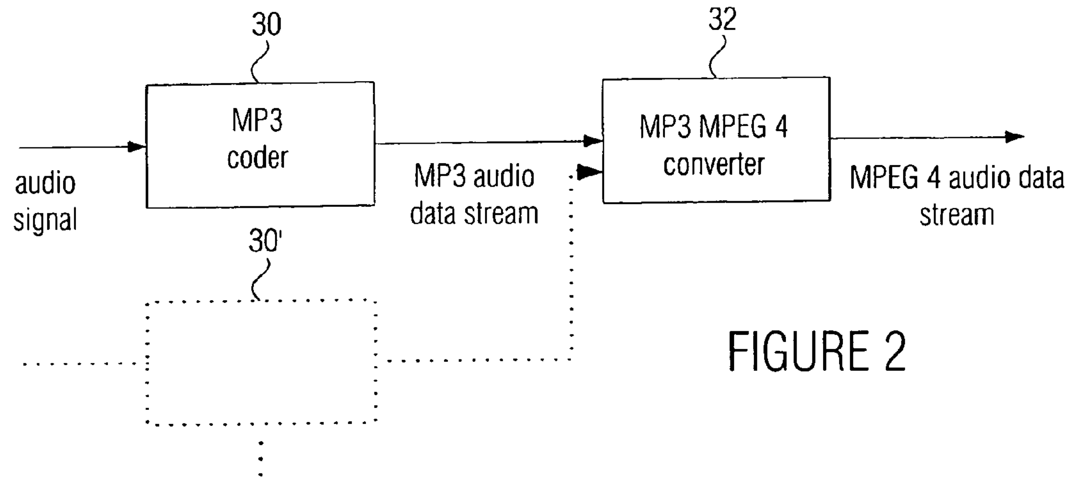
FIG. 2 is a block diagram for illustrating a structure for converting an MP3 audio data stream into an MPEG-4 audio data stream.

FIG. 2 shows an MP3 coder 30 and an MP3-MPEG-4 converter 32. The MP3 coder 30 comprises an input where the same receives an audio signal to be coded, and an output where the same outputs an MP3 audio data stream coding the audio signal at the input. The MP3 coder 30 operates according to the above-mentioned MP3 standard.

The MP3 audio data stream whose structure has been discussed with reference to FIG. 1 consists, as mentioned, of frames with a fixed frame length, which depends on a set bit rate and the underlying sample rate as well as a padding byte, which is set or not set. The MP3-MPEG-4 converter 32 receives the MP3 audio data stream at an input an outputs an MPEG-4 audio data stream at an output, the structure of which results from the subsequent description of the mode of operation of the MP3-MPEG-4 converter 32. The purpose of the converter 32 is to convert the MP3 audio data stream from the MP3 format into the MPEG-4 format. The MPEG-4 data format has the advantage that all main data pertaining to a certain time mark are included in a contiguous access unit or channel element, so that manipulating the latter is eased significantly.

Figure 3:
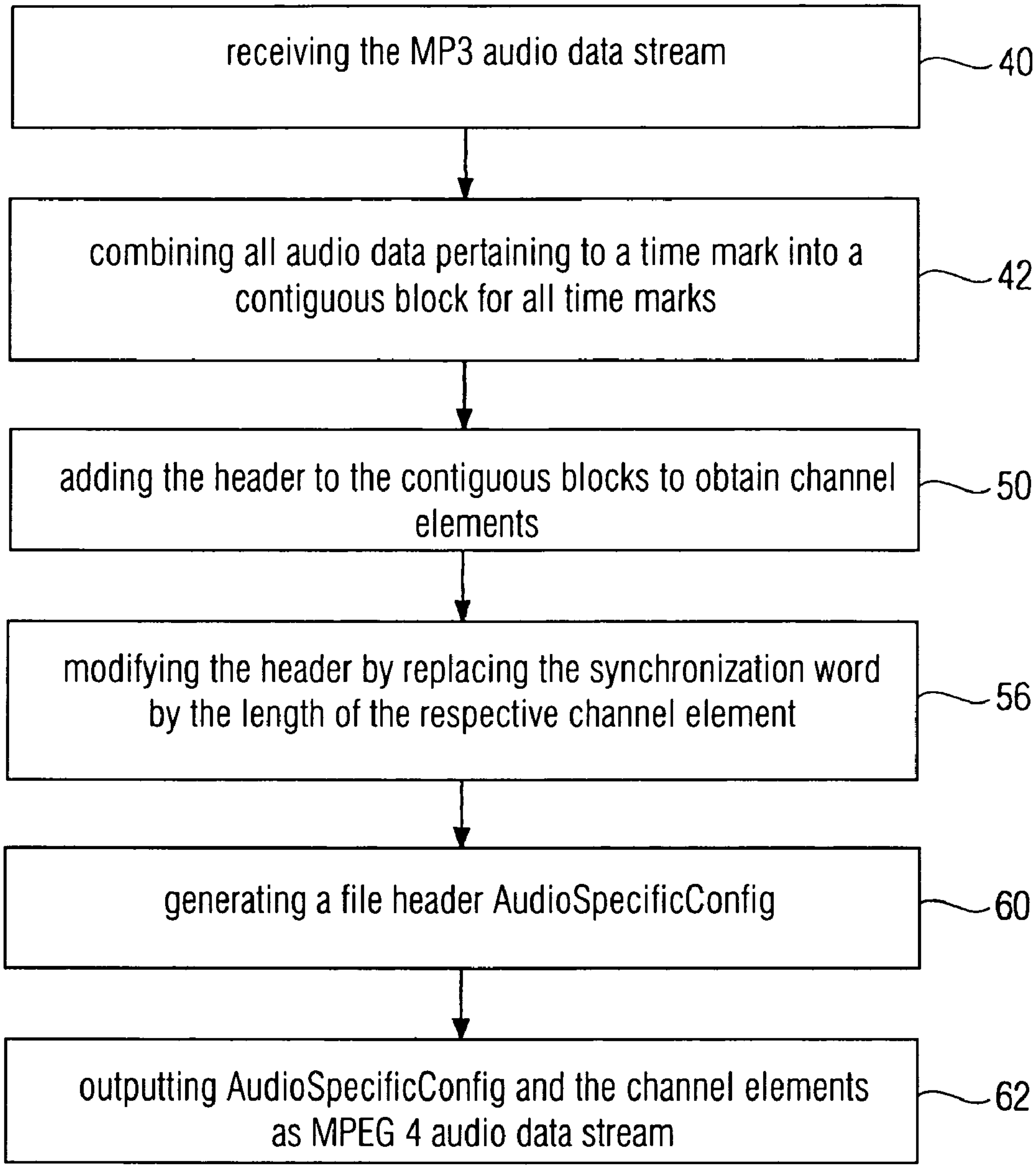
FIG. 3 is a flow diagram of a method for converting an MP3 audio data stream into an MPEG-4 audio data stream according to an embodiment of the present invention.

FIG. 3 shows the individual method steps during conversion of the MP3 audio data stream into the MPEG-4 audio data stream performed by the converter 32. First, the MP 3 audio data stream is received in a step 40. Receiving can comprise storing the full audio data stream or merely a current part of the same in a latch. Correspondingly, the subsequent steps during conversion can either be performed during receiving 40 in real time or only following that.

Then, in a step 42, all audio data or main data, respectively, pertaining to a time mark are combined in a contiguous block, and this is performed for all time marks.

Figure 4:
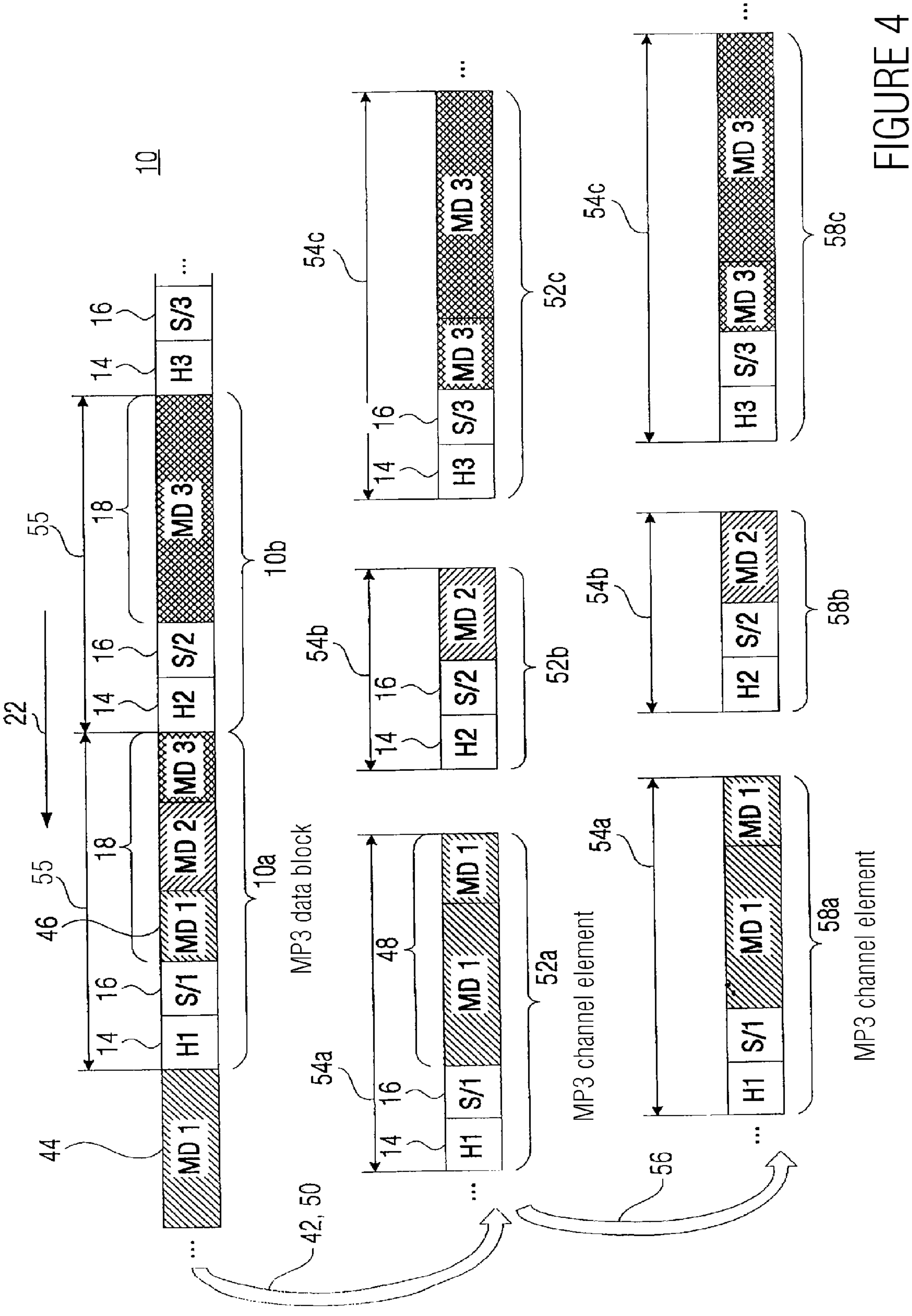
FIG. 4 is a schematical drawing for illustrating the step of combining associated audio data by adding the determination blocks and the step of modifying the determination blocks in the method of FIG. 3.

Step 42 is illustrated in more detail schematically in FIG. 4, wherein in this figure the elements of an MP3 audio data stream similar to the elements illustrated in FIG. 1, are provided with the same or similar reference numbers and a repeated description of these elements is omitted.

As can be seen from the data stream direction 22, these parts of the MP3 audio data stream 10 illustrated farther to the left in FIG. 4 reach the converter 32 earlier than the right parts of the same. Two data blocks 10*a* and 10*b* are illustrated fully in FIG. 4. The time mark pertaining to the data block 10*a* is coded by the main data MD1 included in FIG. 4 exemplarily partly in a data block prior to the data block 10 and partly in the data block 10*a*, and here particularly in the main data part 18 of the same. Those main data coding the time mark to which the subsequent data block 10*b* is associated, are exclusively included in the main data part 18 of the data block 10*a* and indicated by MD2. The main data MD3 pertaining to the data block following the data block 10*b* are distributed among the main data parts 18 of the data blocks 10*a* and 10*b*. In step 42, the converter 42 combines all pertaining main data, i.e. all main data coding one and the same time mark, into contiguous blocks. In that way, the portion 44 prior to the data block 10*a* of the portion 46 in the data block 10*a* in the main data MD1 result in the contiguous block 48 by combining after step 42. The same is performed for the other main data MD2, MD3.

For performing step 42, the converter 32 reads the pointer in the side information 16 of a data block 10*a* and then, based on this pointer, the respective first part 44 of the determination block audio data 12*a* for this data block 10*a* included in the field 18 of a previous data block, beginning at the position determined by the pointer up to the header of the current data block 10*a*. Then he reads the second part 46 of the determination block audio data included in part 18 of the current data block 10*a* and comprising the end of the determination block audio data for this data block 10*a* beginning from the end of the side information 16 of the current audio data block 10*a* to the beginning of the next audio data, here indicated by MD2, to the next data block 10*b*, to which the pointer in the side information 16 of the subsequent data block 10*b* points, which the converter 32 reads as well. Combining the two parts 44 and 46 results, as described, in block 48.

In a step 50, the converter 32 adds the associated header 14 including the associated side information 16 to the contiguous blocks to finally form MP3 channel elements 52*a*, 52*b* and 52*c*. Thus, every MP3 channel element 52*a*-52*c* consists of the header 14 of a corresponding MP3 data block, a subsequent side information part 16 of the same MP3 data block, and the contiguous block 48 of main data coding the time mark to which the data block is associated from which header and side information originate.

The MP3 channel elements resulting from steps 42 and 50 have different channel element lengths, as indicated by double arrows 54*a*-54*c*. It should be noted that the data blocks 10*a*, 10*b* in the MP3 audio data stream 10 had a fixed frame length 56, but that the number of main data for the individual time marks varies around an average value due to the bit reservoir function.

For easing decoding and particularly parsing of the individual MP3 channel elements 52*a*-52*c* on the decoder side, the headers 14 H1-H3 are modified to obtain the length of the respective channel element 52*a*-52*c*, i.e. 54*a*-54*c*. This is performed in a step 56. The length input is written into a part identical or redundant, respectively, for all headers 14 of the audio data stream 10. In the MP3 format, every header 14 receives in the beginning a fixed synchronizations word (syncword) consisting of 12 bits. In step 56, this syncword is occupied by the length of the respective channel element. The 12 bits of the syncword are sufficient to represent the length of the respective channel element in binary form, so that the length of the resulting MP3 channel elements 58*a*-58*c* with modified header h1-h3 remains the same despite step 56, i.e. equal to 54*a*-54*c*. In that way, the audio information can also be transmitted with the same bit rate in real time or be played like the original MP3 audio data stream 10 after combining the MP3 channel elements 58*a*-58*c* according to the order of the time mark coded by the same despite adding the length indication, as long as no further overhead is added by additional headers.

In a step 58, *a* file header, or for the case that the data stream to be generated is not a file but streaming, a data stream header is generated for the desired MPEG-4 audio data stream (step 60). Since, according to the present embodiment, an MPEG-4-compliant audio data stream is to be generated, a file header is generated according to MPEG-4 standard, wherein in that case the file header has a fixed structure due to the function AudioSpecificConfig, which is defined in the above-mentioned MPEG-4 standard. The interface to the MPEG-4 system is provided by the element ObjectTypeIndication set with the value 0×40, as well as by the indication of an audioObjectType with the number 29. The MPEG-4-specific AudioSpecificConfig is extended as follows corresponding to its original definition in ISO/IEC 14496-3, wherein in the following example only the contents of the AudioSpecificConfig significant for the present description and not all of them are considered:

```
1   AudioSpecificConfig( ) {
2       audioObjectType;
3   samplingFrequencyIndex;
4   if(samplingFrequencyIndex==0xf)
5       samplingFrequency;
6   channelConfiguration;
7   if(audioObjectType==29){
8       MPEG_1_2_SpecificConfig( );
9       }
10  }
```

The above list of the AudioSpecificConfig is a representation in common notation for the function AudioSpecificConfig, which serves for parsing or reading the call parameters in the file header in the decoder, namely the samplingFrequencyIndex, the channelConfiguration, and the audioObjectType, or indicates the instructions how the file header is to be decoded or to be parsed.

As can be seen, the file header generated in step 60 begins with the indication of the audioObjectType, which is set to 29 (line 2) as mentioned above. The parameter audioObjectType indicates to the decoder in what way the data have been coded, and particularly in what way further information for coding the file header can be extracted, as will be described below.

Then, the call parameter samplingFrequencyIndex follows, which points to a certain position in a normed table for sample frequencies (line 3). If the index is 0 (line 4), the indication of the sample frequency follows without pointing to a normed table (line 5).

Then, the indication of a channel configuration follows (line 6), which indicates in a way that will be discussed below in more detail, how many channels are included in the generated MPEG-4 audio data stream, where it is also possible, in contrast to the present embodiment, to combine more than one MP3 audio data stream to one MPEG-4 audio data stream, as will be described below with reference to FIG. 5.

Then, if the audioObjectType is 29, which is the case here, a part in the file header AudioSpecificConfig, containing a redundant part of the MP3 frame header in the audio data stream 10 follows, i.e. that part remaining the same among the frame headers 14 (line 8). This part is here indicated by MPEG_1_2_SpecificConfig( ), again a function defining the structure of this part.

Although the structure of MPEG_1_2_SpecificConfig can also be taken from the MP3 standard, since it corresponds to the fixed part of an MP3 frame header that does not change from frame to frame, the structure of the same is listed below exemplarily:

```
1   MPEG_1_2_SpecificConfig(channelConfiguration){
2       syncword
3       ID
4       layer
5       reserved
6       sampling_frequency
7       reserved
8       reserved
9       reserved
10      if(channelConfiguration==0){
11          channel configuration description;
12      }
13  }
```

In the part MPEG_1_2_SpecificConfig all bits differing from frame header to frame header 14 in the MN3 audio data stream are set to 0. In any case, the first parameter MPEG_1_2_SpecificConfig, namely the 12-bit-synchronization word syncword serving for synchronization of an MP3 coder when receiving an MP3 audio data stream (line 2), is the same for every frame header. The subsequent parameter ID (line 3) indicates the MPEG version, i.e. 1 or 2, by the corresponding standard ISO/IEC 13818-3 for version 2 and the standard ISO/IEC 11172-3 for version 1. The parameter layer (line 4) gives an indication to layer 3, which corresponds to the MP3 standard. The following bit is reserved (line 5), since its value can change from frame to frame and is transmitted by the MP3 channel elements. This bit shows possibly that the header is followed by a CRC variable. The next variable sampling_frequency (line 6) points to a table with sample rates defined in MP3 standard and thus indicates the sample rate underlying the MP3-DCT coefficients. Then, in line 7, the indication of a bit for specific applications (reserved) follows, as well as in lines 8 and 9. Then, (in lines 11, 12) the exact definition of the channel configuration follows when the parameter indicated in line 6 of the AudioSpecificConfig does not point to a predefined channel configuration but has the value 0. Otherwise, the channel configuration of 14496-3 subpart 1 table 1.11 applies.

By step 60 and in particularly by providing the element MPEG_1_2_SpecificConfig in the file header, which includes all redundant information in the frame headers 14 of the original MP3 audio data stream 10, it is ensured that this redundant part in the frame headers does not lead to irretrievable loss of this information in the MPEG-4 file to be generated during the insertion of data easing decoding, such as in step 56 by inserting the channel element length, but that this modified part can be reconstructed based on the MPEG-4 file header.

Then, in step 62, the MPEG-4 audio data stream is output in the order of the MPEG-4 file header generated in step 60 and the channel elements in the order of their associated time marks, wherein the full MPEG-4 audio data stream results in an MPEG-4 file or is transmitted by MPEG-4 systems.

The above description related to the conversion of an MP3 audio data stream into an MPEG-4 audio data stream. However, as can be seen with dotted lines in FIG. 2, it is also possible to convert two or more MP3 audio data streams from two MP3 coders, namely 30 and 30' into an MPEG-4 multi-channel audio data stream. In that case, the MP3-MPEG-4 converter 32 receives the MP3 audio data stream of all coders 30 and 30' and outputs the multi-channel audio data stream in MPEG-4 format.

Figure 5:
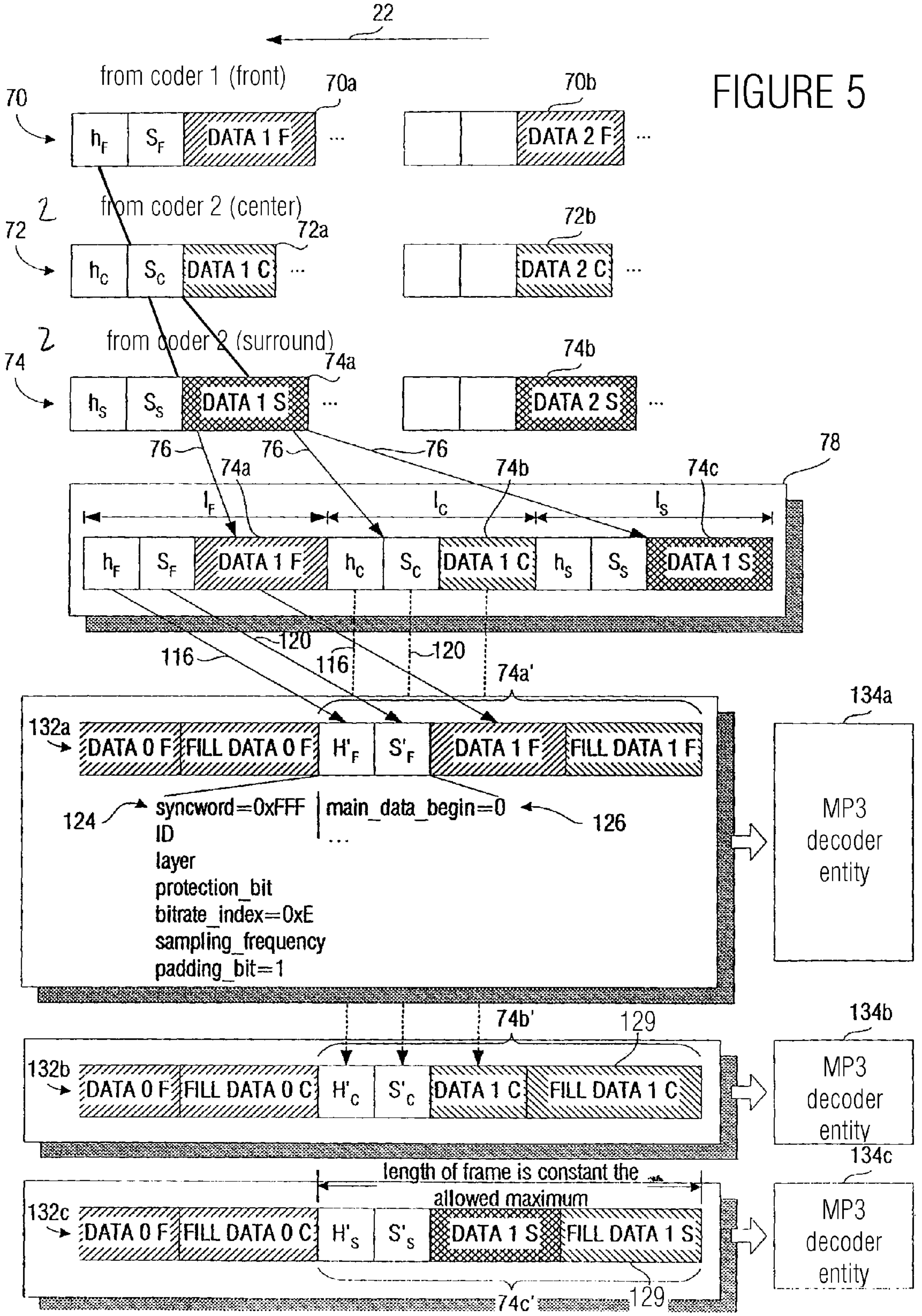
FIG. 5 is a schematical drawing for illustrating a method for converting several MP3 audio data streams into a multichannel MPEG-4 audio data stream according to a further embodiment of the present invention.

In the upper half, FIG. 5 illustrates in relation to the representation of FIG. 4 in what way the multi-channel audio data stream according to MPEG-4 can be obtained, wherein the conversion is again performed by the converter 32. Three channel element sequences 70, 72 and 74 are illustrated, which have been generated according to steps 40-56 from the one audio signal each by an MP3 coder 30 or 30' (FIG. 2). From every sequence of channel elements 70, 72 and 74, two respective channel elements are shown, namely 70*a*, 70*b*, 72*a*, 72*b* or 74*a*, 74*b*, respectively. In FIG. 5, the channel elements disposed above one another, here 70*a*-74*a* or 70*b*-74*b*, respectively, are each associated to the same time mark. The channel elements of sequence 70, for example, code the audio signal that has been recorded according to a suitable normation on the front left, right (front), while the sequences 72 and 82 code audio signals representing a recording of the same audio source from other directions or with another frequency spectrum, such as the central front loudspeaker (center) and from the back right and left (surround).

As indicated by arrows 76, these channel elements are now combined to units during the output (cf. step 62 in FIG. 3) in the MPEG-4 audio data stream, referred to below as access units 78. Thus, in the MPEG-4 audio data stream, the data within an access unit 78 always relate to a time mark. The arrangement of MP3 channel elements 70*a*, 72*a* and 74*a* within the access unit 78, here in the order front, center and surround channel, is considered in the file header as generated for the MPEG-4 audio data stream to be generated (cf. step 60 in FIG. 3) by respectively setting the call parameter channel configuration in the AudioSpecificConfig, reference again being made to subpart 1 in ISO/IEC 14496-3.

The access units 78 are again successively arranged in the MPEG-4 stream according to the order of their time marks, and they are preceded by the MPEG-4 file header. The parameter channelconfiguration is set appropriately in the MPEG-4 file header to indicate the order of channel elements in the access units or their significance on decoder side, respectively.

As the above description of FIG. 5 has shown, it is very easy to combine MP3 audio data streams into a multi-channel audio data stream when, as proposed according to the present invention, the MP3 audio data streams are manipulated to obtain self-contained channel elements from the data blocks, wherein all data for one time mark are included in one channel element, wherein these channel elements of the individual channels can then easily be combined into access units.

The present description related to the conversion of one or several MP3 audio data streams into an MPEG-4 audio data stream. However, it is a significant finding of the present invention that all the advantages of the resulting MPEG-4 audio data stream, such as improved manageability of the individual self-contained MP3 channel elements with equal transmission rate and the possibility of multi-channel transmission can be utilized without having to replace existing MP3 coders fully by new decoders, but that the reconversion can also be performed unproblematically, so that the same can be used during decoding the above-described MPEG-4 audio data stream.

Figure 6:
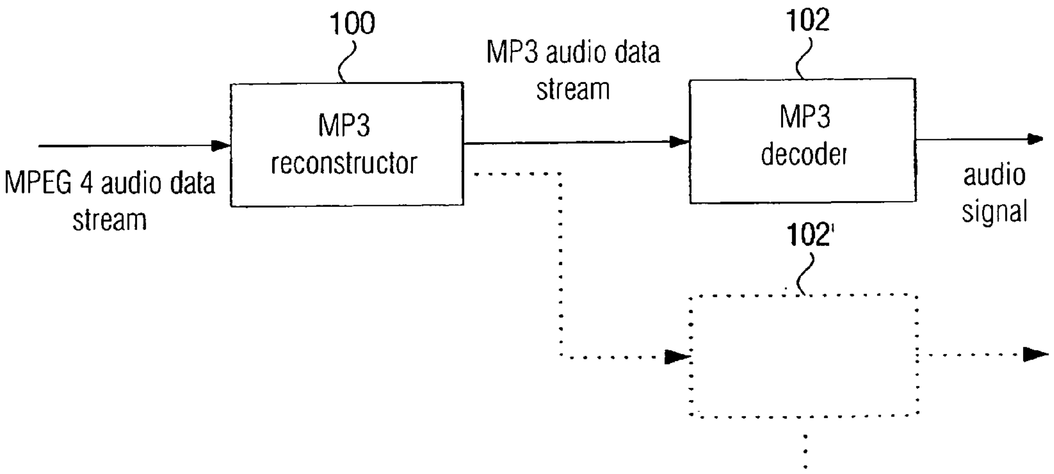
FIG. 6 is a block diagram of an arrangement for converting an MPEG-4 audio data stream obtained according to FIG. 3 back to an MP3 audio data stream for being able to decode the same by existing MP3 decoders.

In FIG. 6, this is illustrated in an arrangement of an MP3 reconstructor 100 whose mode of operation will be discussed in more detail below, and of MP3 decoders 102, 102' . . . . An MP3 reconstructor receives at its input an MPEG-4 audio data stream as generated according to one of the previous embodiments, and outputs one or, in the case of a multi-channel audio data stream, several MP3 audio data streams to one or several MP3 decoders 102, 102' . . . , which themselves decode the respectively received MP3 audio data stream to a respective audio signal and pass it on to respective loudspeakers disposed according to the channel configuration.

A particularly simple way of reconstructing the original MP3 audio data streams of an MPEG-4 audio data stream generated according to FIG. 5, will be described with reference to FIG. 5 below and FIG. 7, wherein these steps are performed by the MP3 reconstructor of FIG. 6.

First, the MP3 reconstructor 100 verifies in a step 110 that the MPEG-4 audio data stream received at the input is a reformatted MP3 audio data stream, by checking the call parameter audioObjectType in the file header according to the AudioSpecificConfig whether the same includes the value 29. If this is the case (line 7 in the AudioSpecificConfig), the MP3 reconstructor 100 proceeds with parsing the file header of the MPEG-4 audio data stream and reads the redundant part of all frame headers of the original MP3 audio data stream from part-MPEG_1_2_SpecificConfig from which the MPEG-4 audio data stream has been obtained (step 112).

After evaluating the MPEG_1_2_SpecificConfig, the MP3 reconstructor 100 replaces in the step 114 in every channel element 74*a*-74*c* in the respective header $h_F$, $h_C$, $h_S$ one or several parts of the channel elements by components of the MPEG_1_2_SpecificConfig, particularly the channel element length indication by the synchronization word from MPEG_1_2_SpecificConfig to obtain the original MP3 audio data stream frame headers $H_F$, $H_C$ and $H_S$ again, as indicated by arrows 116. In a step 118, the MP3 reconstructor 100 modifies the side information $S_f$, $S_c$ and $S_s$ in the MPEG-4 audio data stream in every channel element. Particularly, the backpointer is set to 0 to obtain new side information $S'_F$, $S'_C$ and $S'_S$. The manipulation according to step 118 is indicated in FIG. 5 by arrows 120. Then, in a step 122, the MP3 reconstructor 100 sets the bit rate index in every channel element 74*a*-74*c* in the frame header $H_F$, $H_C$, $H_S$ provided in step 114 with the synchronization word instead of the channel element length indication to the highest allowable value. In the end, the resulting headers differ from the original ones, which is indicated in FIG. 5 by an apostrophe, i.e. $H'_F$, $H'_C$ and $H'_S$. The manipulation of the channel elements according to step 122 is also indicated by arrow 116.

For illustrating the changes of steps 114-122 again, individual parameters are listed in FIG. 5 for the header $H'_F$ and the side index part $S'_F$. In 124, individual parameters of the header $H'_F$ are indicated. The frame header $H'_F$ begins with the parameter syncword. Syncword is set to the original value (step 114) as it is the case in every MP3 audio data stream, namely to the value 0×FFF. Generally, a frame header $H'_F$ as resulting after steps 114-122 differs from the original MP3 frame header as included in the original MP3 audio data stream 10 only by the fact that the bit rate index is set to the highest allowable value, which is 0×E according to MP3 standard.

The purpose of changing the bit rate index is to obtain a new frame length or data block length, respectively, for the newly to be generated MP3 audio data stream, which is greater than the one of the original MP3 audio data stream, from which the MPEG-4 audio data stream with access unit 78 has been generated. The trick hereby is that the frame length in bytes in MP3 format always depends on the bit rate, according to the following equation:

for MPEG 1 layer 3:

frame length[Bit]=1152*bit rate[Bit/s]/sample rate [Bit/s]++8*paddingbit[Bit]

for MPEG 2 layer 3:

frame length[Bit]=576*bit rate[Bit/s]/sample rate[Bit/s]++8*paddingbit[Bit]

In other words, the frame length of an MP3 audio data stream according to the standard is directly proportional to the bit rate and indirectly proportional to the sample rate. As additional value, the value of the padding bits is added, which is indicated in the MP3 frame headers $h_F$, $h_C$, $h_S$ and can be used to set the bit rate exactly. The sample rate is fixed, since it determines with what speed the decoded audio signal is played. The conversion of the bit rate compared to the original setting allows to accommodate such MP3 channel elements 74-74*c* in a data block length of the newly to be generated MP3 audio data stream, which are longer than the original, since for generating the original audio data stream the main data have been generated by taking bits from the bit reservoir.

Thus, while in the present embodiment the bit rate index is always set to the highest allowable value, it would further be possible to increase the bit rate index only to a value sufficient to result in a data block length according to the MP3 standard, so that even the longest MP3 channel elements 74*a*-74*c* would fit from their length.

At 126, it is illustrated that the backpointer main_data_begin is set to 0 in the resulting side information. This only means that in the MP3 audio data stream generated according to the method of FIG. 7 the data blocks are always self-contained, so that the main data for a certain frame header and the side information always begin directly after the side information and end within the same data block.

Steps 114, 118, 122 are performed at every channel element, by extracting each of the same from their access units, wherein the channel element length indications are useful during extraction.

Then, in a step 128, that amount of fill data or don't care bits are added to every channel element 74*a*-74*c* to increase the length of all MP3 channel elements unitarily to the MP3 data block length as set by the new bit rate index 0×E. These fill data are indicated at 128 in FIG. 5. The amount of fill data can be calculated for every channel element, for example, by evaluating the channel element length indication and the padding bit.

Then, in a step 130, the channel elements shown in FIG. 5 at 74*a*'-74*c*' modified according to the previous steps, are passed on to a respective MP3 decoder or an MP3 decoder entity 134*a*-134*c* as data blocks of an MP3 audio data stream in the order of the coded time marks. The MPEG-4 file header is omitted. The resulting MP3 audio data streams are indicated in FIG. 5 generally by 132*a*, 132*b* and 132*c*. The MP3 decoder entities 134*a*-134*c* have, for example, been initialized before, the same number as channel elements are included in the individual access units.

The MP3 reconstructor 100 knows which channel elements 74*a*-74*c* in an access unit 78 of the MPEG-4 audio data stream pertain to which of the to-be-generated MP3 audio data streams 132*a*-132*c* from an evaluation of the call parameter channelConfiguration in the AudioSpecificConfig of the MPEG-4 audio data stream. Thus, the MP3 decoder entity 134*a* connected to the front loudspeaker receives the audio data stream 132*a* corresponding to the front channel, and correspondingly the MP3 decoder entities 134*b* and 134*c* receive the audio data streams 132*b* and 132*c* associated to the center and surround channel and output the resulting audio signals to respectively disposed loudspeakers for example to a subwoofer or to loudspeakers disposed at the back left and back right, respectively.

Of course, for real-time coding of the MPEG-4 audio data stream by the arrangement of FIG. 6 with the decoder entities 102, 102' or 134*a*-134*c* it is required to transmit the newly generated MP3 audio data streams 132*a*-132*c* with the bit rate increased in step 122, which is higher than in the original audio data stream 10, which is, however, no problem since the arrangement between MP3 reconstructor 100 and the MP3 decoders 102, 102' or 134*a*-134*c* is fixed, so that here the transmission paths are correspondingly short and can be designed with correspondingly high data rate with low cost and effort.

According to the embodiment described with reference to FIG. 7, an MPEG-4 multi-channel audio data stream obtained according to FIG. 5 from original audio data streams 10 has not been reconverted exactly to the original MP3 audio data streams, but other MP3 audio data streams have been generated from the same, wherein in contrast to the original audio data streams, all backpointers are set to 0 and the bit rate index is set to the highest value. The data blocks of these newly generated MP3 audio data streams are thus also self-contained insofar as all data associated to a certain time mark are included in the same data block 74'*a*-74'*c*, and fill data have been used to increase the data block length to a unitary value.

Figure 8:
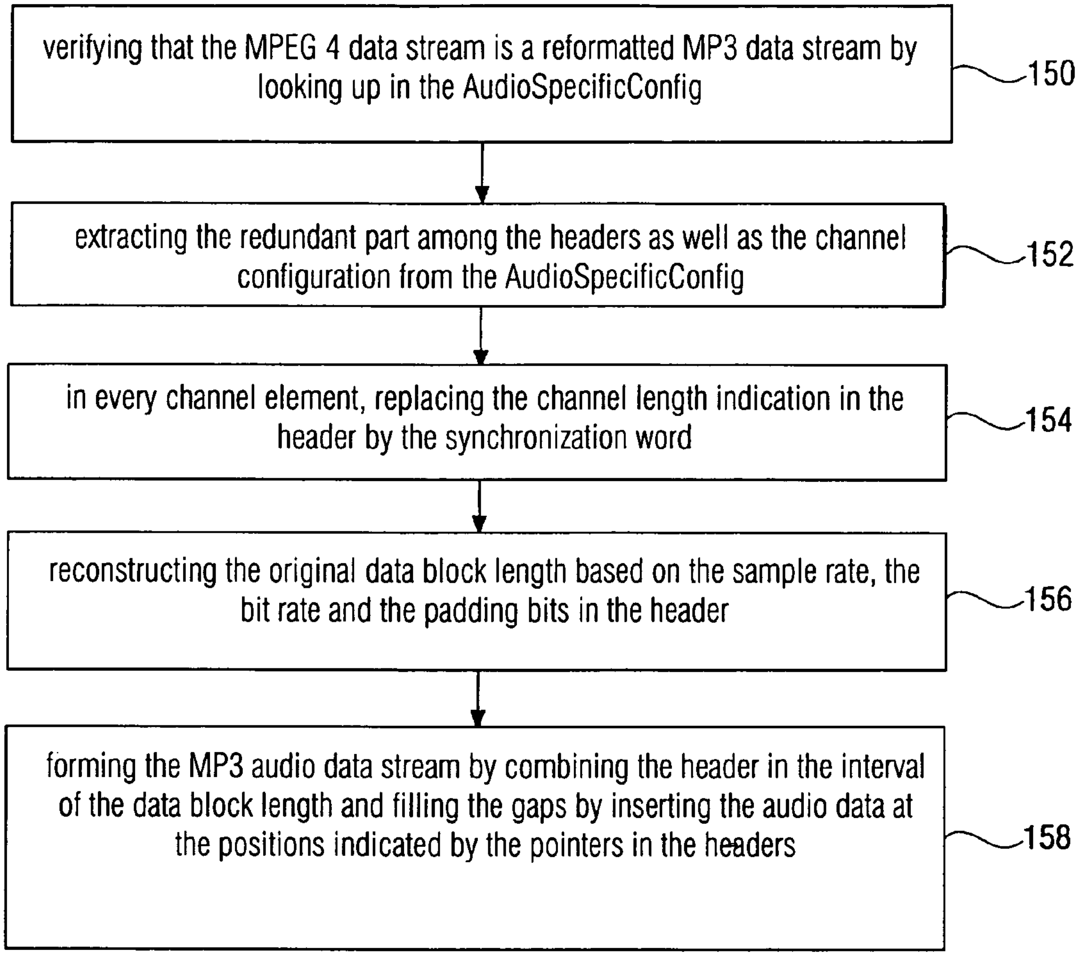
FIG. 8 is a flow diagram of a method for reconverting the MPEG-4 audio data stream obtained according to FIG. 3 into one or several audio data streams in MP3 format according to a further embodiment of the present invention.

FIG. 8 shows an embodiment for a method according to which it is possible to reconvert an MPEG-4 audio data stream generated according to the embodiments of FIGS. 1-5 into the original MP3 audio streams or the original MP3 audio data stream, respectively.

In that case, the MP3 reconstructor 100 tests again in a step 150 exactly as in step 110 whether the MPEG-4 audio data stream is a reformatted MP3 audio data stream. The subsequent steps 152 and 154 also correspond to steps 112 and 114 of the procedure of FIG. 7.

Instead of changing the backpointers in the side information and the bit rate index in the frame headers, the MP3 reconstructor 100 reconstructs, according to the method of FIG. 8, in step 156 the original data block length in the original MP3 audio data streams converted to the MPEG-4 audio data stream, based on the sample rate, the bit rate and the padding bit. The sample rate and the padding indication are indicated in the MPEG_1_2_SpecificConfig, and the bit rate in every channel element, if the latter is different from frame to frame.

The equation for calculating the original frame length of the original and to-be-reconstructed audio data stream is again as above mentioned for MPEG 1 layer 3:

frame length[Bit]=1152*bit rate[Bit/s]/sample rate [Bit/s]++8*paddingbit[Bit]

for MPEG 2 layer 3:

frame length[Bit]=576*bit rate[Bit/s]/sample rate[Bit/s]++8*paddingbit[Bit]

Then, the MP3 audio data stream or the MP3 audio data streams, respectively, are generated by arranging the respective frame headers from the respective channel in an interval of the calculated data block length and the gaps are filled up by inserting the audio date or main data, respectively, at the positions indicated by the pointers in the side information. Different from the embodiments of FIG. 7 or 5, respectively, the main data associated to the respective header or the respective side information, respectively, are inserted into the MP3 audio data stream at the beginning of the position indicated by the backpointer. Or, in other words, the beginning of the dynamic main data is offset corresponding to the value of main_data_begin. The MPEG-4 file header is omitted. The resulting MP3 audio data stream or the resulting MP3 audio data streams, respectively, correspond to the original MP3 audio data streams on which the MPEG-4 audio data stream was based. These MP3 audio data streams could thus be decoded by conventional MP3 decoders into audio signals, like the audio data streams of FIG. 7.

With regard to the previous description, it should be noted that the MP3 audio data streams described as single-channel MP3 audio data streams had at some positions actually already been two-channel MP3 audio data streams defined according to ISO/IEC standard 13818-3, wherein, however, the description did not go into detail about that since it does not change anything with regard to the understanding of the present invention. Matrix operations from the transmitted channels for retrieving the input channel on decoder side and the usage of several backpointers in these multi-channel signals have not been discussed, but reference is made to the respective standard.

The above embodiments made it possible to store MP3 data blocks in altered form in MPEG-4 file format. MPEG-1/2-audio-layer-3, short MP3 or proprietary formats like MPEG2.5 or mp3PRO derived therefrom can be packed into an MPEG-4 file based on these procedures, so that this new representation represents a multi-channel representation of an arbitrary number of channels in a simple way. Using the complicated and hardly used method from the standard ISO/IEC 13818-3 is not required. Particularly, the MP3 data blocks are packed such that every block—channel element of access unit—pertains to a defined time mark.

In the above embodiments for changing the format of the digital signal representation, parts of the representation have been overwritten with different data. In other words, information required or useful for the decoder are written across the part of the MP3 data block that is constant for different blocks within a data stream.

By packing several mono or stereo data blocks into an access unit of the MPEG-4 file format, a multi-channel representation could be obtained, which is significantly easier to handle compared to the representation from standard ISO/IEC 13818-3.

In the previous embodiments, the representation of an MP3 data block has been formatted in such a different way that all data pertaining to a certain time mark are also included within one access unit. This is generally not the case in MP3 data blocks, since the element main_data_begin or the backpointerin the original MP3 data block, respectively, can point to earlier data blocks.

The reconstruction of the original data stream could also be performed (FIG. 8). This means, as shown, that the retrieved data streams can be processed by every conforming decoder.

Above that, the above embodiments allow coding or decoding of more than two channels. Further, in the above embodiments, the ready-coded MP3 data only have to be reformatted by simple operations to obtain a multi-channel format. On the other hand, on the coder side, only this operation or these operations, respectively, had to be reversed.

While an MP3 data stream usually includes data blocks of differing lengths, since the dynamic data pertaining to one block can be packed into previous blocks, the previous embodiments bundled the dynamic data directly behind the side information. The resulting MPEG-4 audio data stream had a constant medium bit rate, but data blocks of differing lengths. The element main_data_begin or the backpointer, respectively, is transmitted in an unaltered way to ensure reproduction of the original data stream.

Further, with reference to FIG. 5, an extension of the MPEG-4 syntax has been described to pack several MP3 data blocks as MP3 channel elements to one multi-channel format within an MPEG-4 file. All MP3 channel element entries pertaining to one point of time were packed in one access unit. Corresponding to the MPEG-4 standard, the suitable information for configuration on the coder side can be taken from the so-called AudioSpecificConfig. Apart from the audioObjectType, the sample rate and channel configuration etc., the same includes a descriptor relevant for the respective audioObjectType. This descriptor has been described above with regard to the MPEG_1_2_SpecificConfig.

According to the previous embodiments, the 12-bit MPEG-1/2 syncword in the header has been replaced by the length of the respective MP3 channel element. According to ISO/IEC 13818-3, 12 bits are sufficient therefore. The remaining header has not been modified any further, which can, however, happen for shortening, for example, the frame header and the residual redundant part except the syncword to reduce the amount of information to be transmitted.

Different variations of the above embodiments can easily be carried out. Thus, the sequence in the steps in FIGS. 3, 7, 8 can be altered, particularly steps 42, 50, 56, 60 in FIG. 3, 11, 114, 118, 122 and 128 in FIG. 7, and 152, 154, 156 in FIG. 8.

Figure 7:
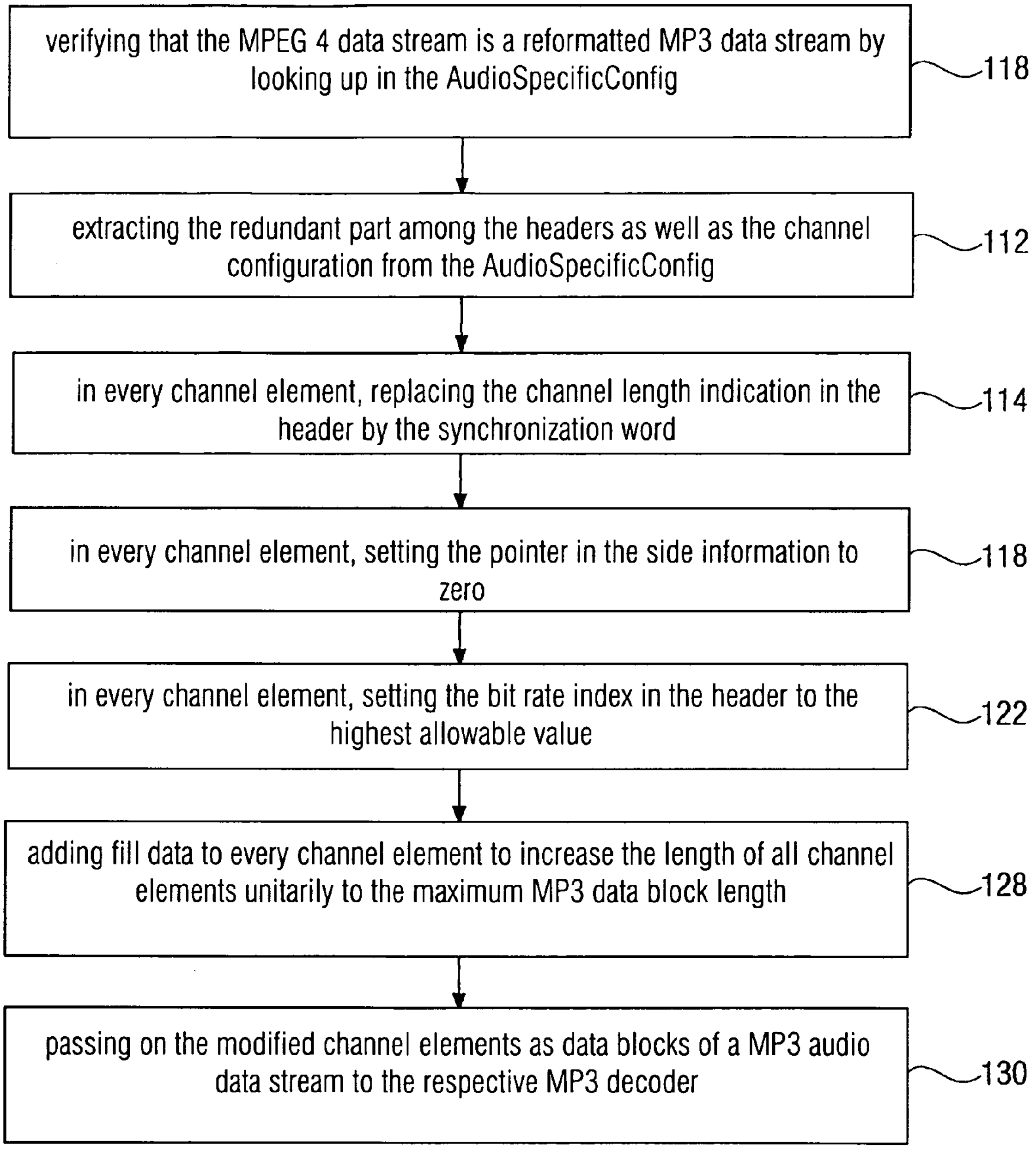
FIG. 7 is a flow diagram of a method for reconverting the MPEG-4 audio data stream obtained according to FIG. 3 into one or several audio data streams in MP3 format.

Further, with regard to FIGS. 3, 7, 8 it should be noted that the steps shown there are performed by respective features in the converter or reconstructor, respectively, of FIGS. 2 or 6, respectively, which can, for example, be embodied as a computer or a hard-wired circuit.

Figure 9:
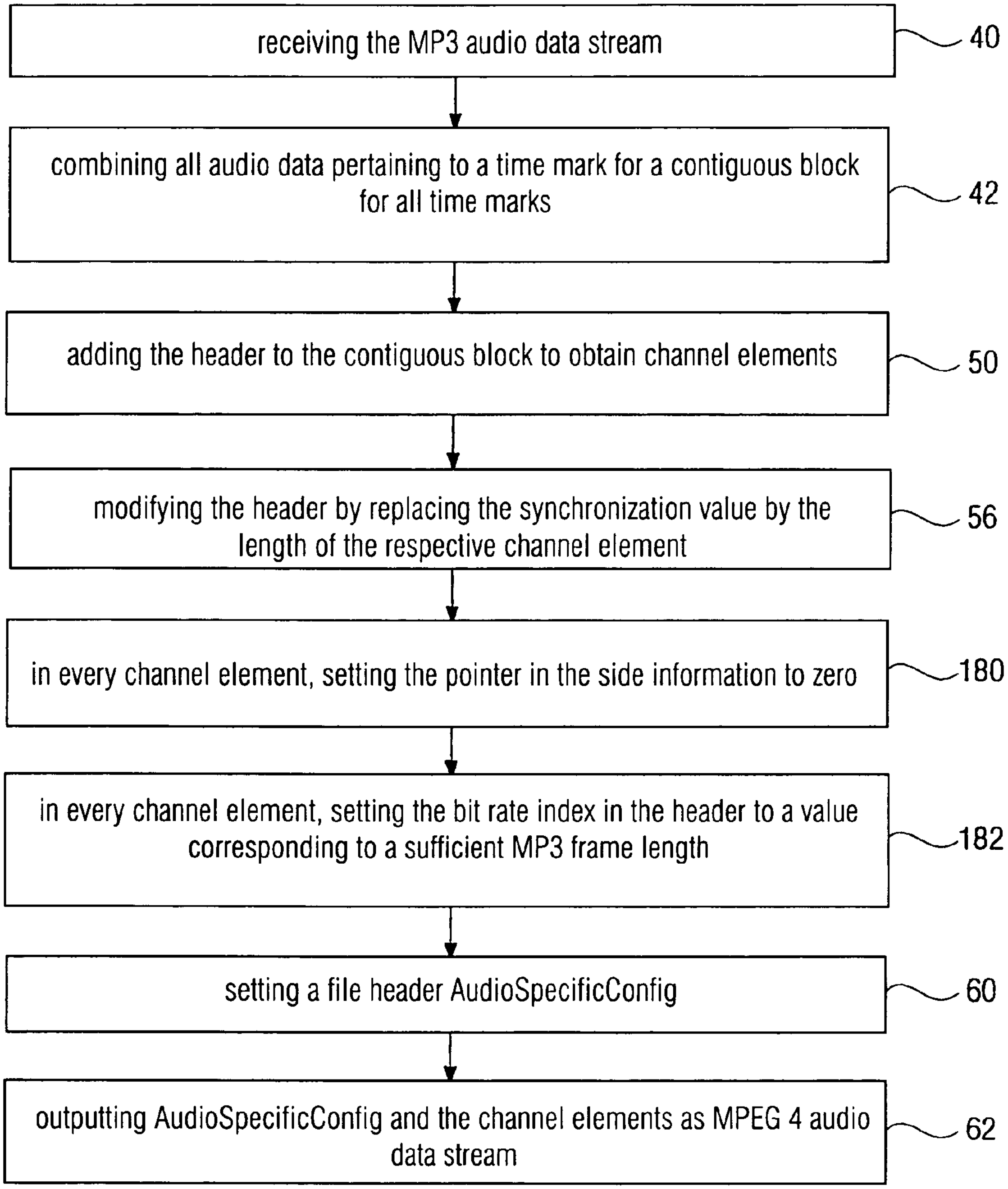
FIG. 9 is a flow diagram of a method for converting an MP3 audio data stream into an MPEG-4 audio data stream according to a further embodiment of the present invention.

In the embodiment of FIG. 7, the manipulation of the headers of the side information, respectively, (steps 118, 122) has been performed for the MP3 decoders on receiver or decoder side, respectively, on the MP3 data stream slightly changed compared to the original MP3 data stream. In many application cases, it can be advantageous to perform these steps on coder or transmitter side, respectively, since the receiver devices are often mass-produced devices, so that savings in electronics on the receiver side allow significantly higher gains. According to an alternative embodiment, it can thus be provided that these steps are already performed during MP3-MPEG-4 data format conversion. The steps according to this alternative format conversion method are shown in FIG. 9, wherein steps identical to the ones in FIG. 3 are provided with the same reference numbers and are not described again to avoid repetitions.

First, the MP3 audio data stream to be converted is received in step 40, and in step 42 the audio data pertaining to a time mark or representing a coding of a time period of the audio signal to be coded by the MP3 audio data stream pertaining to the respective time mark, respectively, are combined into a contiguous block, and this for all time marks. The headers are added again to the contiguous blocks to obtain the channel elements (step 50). However, the headers are not only modified by replacing the synchronization word with the length of the respective channel element as in step 56. Rather, in steps 180 and 182 corresponding to steps 118 and 122 of FIG. 7, further modifications follow. In step 180, the pointer in the side information of every channel element is set to zero, and in step 182, the bit rate index in the header of every channel element is changed such that as described above, the MP3 data block length depending on the bit rate is sufficient to include all audio data of this channel element or the pertaining time mark, respectively, together with the size of the header and the side information. Step 182 might also comprise converting the padding bits in the headers of the successive channel elements to produce an exact bit rate later when supplying the MPEG-4 audio data stream formed by the method of FIG. 9 to a decoder operating according to the method of FIG. 7 but without steps 118 and 122. The padding can of course also be performed on the decoder side within step 128.

In step 182, it can useful to set the bit rate index not to the highest possible value as described with regard to step 122. The value can also be set to the minimum value, which is sufficient to take up all audio data, the header and the side information of a channel element in a calculated MP3 frame length, which can also mean that in the case of passages of the coded audio piece that can be coded with a lesser amount of coefficients, the bit rate index is reduced.

After these modifications, in steps 60 and 62, merely the file header (AudioSpecificConfig) is generated, and the same is output together with the MP3 channel elements as MPEG-4 audio data stream. The same can, as has already been mentioned, be played according to the method of FIG. 7, wherein, however, steps 118 and 122 can be omitted, which eases the implementation on the decoder side. However, steps 42, 50, 56, 180, 182 and 60 can be performed in any order.

The previous description related merely exemplarily to MP3 data streams with fixed data block bit length. Of course, MP3 data streams with variable data block length can be processed according to the previous embodiments, wherein the bit rate index and thus also the data block length changes from frame to frame.

The previous description related to MP3 audio data streams. In other non-pointer-based audio data streams, an embodiment of the present invention provides modifying the headers in the data blocks of exemplarily one MPEG1/2 layer 2 audio data stream containing, apart from the headers, the pertaining side information and the pertaining audio data and thus being already self-contained for generating an MPEG-4 audio data stream. The modification provides every header with a length indication indicating the amount of data of either the respective data block or the audio data in the respective data block so that the MPEG-4 data stream can be decoded easier, particularly when the same is combined of several MPEG 1/2 layer 2 audio data streams into a multichannel audio data stream, similar to the above description with regard to FIG. 5. Preferably, the modification is obtained similar to the above-described manner by replacing the syncwords or another redundant part of the same in the headers of the MPEG 1/2 layer 2 data stream by the length indications. The pointer reformatting or dissolution prior to FIG. 5 by combining the audio data pertaining to one time mark is omitted in layer 2 data streams, since no backpointers exist there. The decoding of an MPEG-4 audio data stream combined of two MPEG 1/2 layer audio data streams representing two channel of a multi-channel audio data stream can easily be performed, by reading out the length indications, and accessing the individual channel elements in the access units based thereon. The same can then be transmitted to conventional MPEG 1/2 layer-compliant decoders.

Further, it is not significant for the present invention where exactly the backpointer is in the data blocks of the pointer-based audio data stream. It could further be directly in the frame headers to define a contiguous determination block together with the same.

Particularly, it should be noted that depending on the conditions, the inventive scheme for file format conversion could also be implemented in software. The implementation can be made on a digital memory medium, particularly a disk or a CD with electronically readable control signals, which can cooperate with a programmable computer system such that the respective method is performed. Thus, generally, the invention consists also of a computer program product with a program code stored on a machine-readable carrier for performing the inventive method when the computer program product runs on a computer. In other words, the invention can also be realized as a computer program with a program code for performing the method when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for converting a first audio data stream representing a coded audio signal comprising time periods and having a first file format into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, wherein determination block audio data are associated to the determination block, which are obtained by coding a time period, wherein the determination block comprises a pointer pointing to a beginning of the determination block audio data, and wherein and end of the determination block audio data lies prior to a beginning of determination block audio data in the audio data stream associated to a next data block, comprising the steps of:

combining the determination block audio data associated to a determination block of at least two data blocks to obtain contiguous determination block audio data forming part of the second audio data stream;

adding the contiguous determination block audio data to the determination block to which the determination block audio data are associated, from which the contiguous determination block audio data are obtained, to obtain a channel element;

arranging the channel elements to obtain the second audio data stream; and modifying the channel element so that said determination block thereof includes a length indication indicating the amount of data of the channel element or an amount of data of the contiguous determination block audio data, wherein the step of modifying comprises replacing a redundant part identical for all determination blocks by the length indication.

2. The method according to claim 1, further comprising the step of:

placing an overall determination block in front of the second audio data stream, wherein the overall determination block has a portion identical to the redundant part identical for all determination blocks.

3. The method according to claim 1, wherein the step of combining comprises the sub-steps of:

reading the pointer in a determination block;

reading a first part of the determination block audio data included in data block audio data of one of the at least two data blocks and comprising the beginning of the determination block audio data to which the pointer of the determination block points;

reading a second part of the determination block audio data included in data block audio data of the other of the at least two data blocks and comprising the end of the determination block audio data; and combining the first and second parts.

4. The method according to claim 1, wherein the data blocks are data blocks of equal or predetermined variable size depending on a sample rate indication and a bit rate indication in the determination block of the data blocks.

5. The method according to claim 1, further comprising the steps of:

resetting the pointers in the determination blocks, so that the determination blocks indicate as a beginning of the determination block audio data that the determination block audio data begin immediately after the respective determination block; and changing the bit rate indications in the determination blocks such that a data block length depending on a bit rate indication according to the first audio file format is sufficient to take up the respective determination block and the associated determination block audio data.

6. A method for combining a first audio data stream representing a coded first audio signal and a second audio data stream representing a coded second audio signal into a multichannel audio data stream, comprising the steps of:

converting the first audio data stream comprising time periods and having a first file format into a first sub-audio data stream representing the first coded audio signal and having a second file format, wherein a time period comprises a number of audio values, and wherein, according to the first file format, the first audio data stream is divided into subsequent data blocks, wherein a data block comprises a determination block and data block audio data, wherein determination block audio data are associated to the determination block, which are obtained by coding a time period, wherein the determination block comprises a pointer pointing to a beginning of the determination block audio data, and wherein and end of the determination block audio data lies prior to a beginning of determination block audio data in the audio data stream associated to a next data block, the conversion of the first audio data stream comprising the steps of:

combining the determination block audio data associated to a determination block of at least two data blocks to obtain contiguous determination block audio data forming part of the first sub-audio data stream;

adding the contiguous determination block audio data to the determination block to which the determination block audio data are associated, from which the contiguous determination block audio data are obtained, to obtain a channel element;

arranging the channel elements to obtain the first sub-audio data stream; and modifying the channel element so that the determination block thereof includes a length indication indicating the amount of data of the channel element or an amount of data of the contiguous determination block audio data, wherein the step of modifying comprises replacing a redundant part identical for all determination blocks by the length indication; and converting the second audio data stream representing the second coded audio signal comprising time periods and having the first file format into a second sub-audio data stream representing the second coded audio signal and having the second file format, wherein a time period comprises a number of audio values, and wherein, according to the first file format, the first audio data stream is divided into subsequent data blocks, wherein a data block comprises a determination block and data block audio data, wherein determination block audio data are associated to the determination block, which are obtained by coding a time period, wherein the determination block comprises a pointer pointing to a beginning of the determination block audio data, and wherein and end of the determination block audio data lies prior to a beginning of determination block audio data in the audio data stream associated to a next data block, the conversion of the second audio data stream comprising the steps of:

combining the determination block audio data associated to a determination block of at least two data blocks to obtain contiguous determination block audio data forming part of the second sub-audio data stream;

adding the contiguous determination block audio data to the determination block to which the determination block audio data are associated, from which the contiguous determination block audio data are obtained, to obtain a channel element;

arranging the channel elements to obtain the second sub-audio data stream;

modifying the channel element so that the determination block thereof includes a length indication indicating the amount of data of the channel element or an amount of data of the contiguous determination block audio data, wherein the step of modifying comprises replacing a redundant part identical for all determination blocks by the length indication; and wherein the steps of arranging are performed such that the two sub-audio data streams together form the multi channel audio data stream, and that in the multi channel audio data stream the channel elements of the first sub-audio data stream and the channel elements of the second sub-audio data stream containing contiguous determination block audio data obtained by coding time periods equal in time are arranged successively in a contiguous access unit.

7. A method for combining a first audio data stream representing a coded first audio signal and a second audio data stream representing a coded second audio signal into a multichannel audio data stream, comprising the steps of:

converting the first audio data stream comprising time periods and having a first file format, into a first sub-audio data stream representing the first coded audio signal and having a second file format, wherein a time period comprises a number of audio values, and wherein, according to the first file format, the first audio data stream is divided into subsequent data blocks, wherein a data block comprises a determination block and data block audio data, the conversion of the first audio data stream comprising the step of:

modifying the data blocks so that the include a length indication indicating the amount of data of the data blocks or an amount of data of the data block audio data to obtain channel elements forming the second audio data stream from the data blocks, wherein the step of modifying includes replacing a redundant part identical for all determination blocks by the length indication; and converting the second audio data stream representing the second coded audio signal comprising time periods and having the first file format into a second sub-audio data stream representing the second coded audio signal and having the second file format, into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, comprising the step of:

modifying the data blocks so that the include a length indication indicating the amount of data of the data blocks or an amount of data of the data block audio data to obtain channel elements forming the second audio data stream from the data blocks, wherein the step of modifying includes replacing a redundant part identical for all determination blocks by the length indication;

wherein the steps of arranging are performed such that the two sub-audio data streams together form the multi channel audio data stream, and that in the multi channel audio data stream the channel elements of the first sub-audio data stream and the channel elements of the second sub-audio data stream containing contiguous determination block audio data obtained by coding time periods equal in time are arranged successively in a contiguous access unit.

8. The method according to claim 7, further comprising the step of:

placing an overall determination block in front of the second audio data stream, the overall determination block including a format indication indicating in which order the channel elements of the first sub-audio data stream and the second sub-audio data stream are arranged in the access units.

9. A method for converting a first audio data stream representing a coded audio signal comprising time periods and having a first file format, into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, comprising the step of:

modifying the data blocks so that the determination blocks thereof include a length indication indicating the amount of data of the data blocks or an amount of data of the data block audio data to obtain channel elements forming the second audio data stream from the data blocks, wherein the step of modifying includes replacing a redundant part identical for all determination blocks by the length indication.

10. A method for decoding a second audio data stream representing a coded audio signal comprising time periods and having a second file format, based on a decoder, which is able to decode a first audio data stream representing the coded signal and having a first file format, into an audio signal, wherein a time period comprises a number of audio values, and wherein according to the first file format, the first audio data stream is divided into successive data blocks, wherein a data block has a determination block and data block audio data, wherein determination block audio data, which are obtained by coding a time period, are associated to the determination block, wherein the determination block includes a pointer pointing to a beginning of the determination block audio data, and wherein an end of the determination block audio data is prior to a beginning of determination block audio data in the audio data stream associated to a next data block, and wherein the second audio data stream is divided into channel elements according to the second file format, wherein a channel element comprises contiguous determination block audio data obtained by combining determination block audio data associated to a determination block from two data blocks, and the associated determination block in a form wherein a previously redundant part, which is identical for al determination blocks, is modified to be replaced by a length indication indicating the amount of data of the respective channel element or an amount of data of the respective contiguous determination block data, comprising the steps of:

forming an input data stream representing the coded audio signal and having a first file format, from the second audio data stream by parsing the second audio data stream by using the length indications;

resetting the pointers in the determination blocks of the channel elements of the second audio data stream, so that the determination blocks indicate as a beginning of the determination block audio data that the determination block audio data begin immediately after the respective determination block to obtain reset determination blocks;

changing a bit rate indication in the determination blocks of the channel elements of the second audio data stream so that a data block length depending on the bit rate indication according to the second audio file format is sufficient to take up the respective determination block and the associated determination block audio data to obtain bit rate-changed and reset determination blocks; and inserting bits between every channel element and the subsequent channel element, so that the length of every channel element plus the inserted bits is adapted to the changed bit rate indication, and supplying the input data stream to the decoder according to the changed bit rate indication to obtain the audio signal.

11. An apparatus for converting a first audio data stream representing a coded audio signal comprising time periods and having a first file format, into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, wherein determination block audio data are associated to the determination block, which are obtained by coding a time period, wherein the determination block comprises a pointer pointing to a beginning of the determination block audio data, and wherein and end of the determination block audio data lies prior to a beginning of determination block audio data in the audio data stream associated to a next data block, comprising:

a combiner for combining the determination block audio data associated to a determination block of two data blocks to obtain contiguous determination block audio data forming part of the second audio data stream;

an adder for adding the contiguous determination block audio data to the determination block to which the determination block audio data are associated, from which the contiguous determination block audio data are obtained, to obtain a channel element;

an arranger for arranging the channel elements to obtain the second audio data stream; and a modifier for modifying the channel element, so that the determination block thereof includes a length indication indicating the amount of data of the channel element or the amount of data of the contiguous determination block audio data, wherein the modifier is formed to replace a redundant part, which is identical for all determination blocks, by the length indication.

12. An apparatus for converting a first audio data stream representing a coded audio signal comprising time periods and having a first file format, into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, comprising a modifier for modifying the data blocks so that the determination blocks thereof include a length indication indicating the amount of data of the data blocks or an amount of data of the data block audio data to obtain channel elements forming the second audio data stream from the data blocks, wherein the step of modifying includes replacing a redundant part, which is identical for all determination blocks, by the length indication.

13. An apparatus for decoding a second audio data stream representing a coded audio signal comprising time periods and having a second file format, based on a decoder, which is able to decode a first audio data stream representing the coded signal and having a first file format, into an audio signal, wherein a time period comprises a number of audio values, and wherein according to the first file format, the first audio data stream is divided into successive data blocks, wherein a data block has a determination block and data block audio data, wherein determination block audio data, which are obtained by coding a time period, are associated to the determination block, wherein the determination block includes a pointer pointing to a beginning of the determination block audio data, and wherein an end of the determination block audio data is prior to a beginning of determination block audio data in the audio data stream associated to a next data block, and wherein the second audio data stream is divided into channel elements according to the second file format, wherein a channel element comprises contiguous determination block audio data obtained by combining determination block audio data associated to a determination block from two data blocks, and the associated determination block, in a form wherein a previously redundant part, which is identical for al determination blocks, is modified to be replaced by a length indication indicating the amount of data of the respective channel element or an amount of data of the respective contiguous determination block data comprising:

a former for forming an input data stream representing the coded audio signal and having a first file format, from the second audio data stream by parsing the second audio data stream by using the length indications;

resetting the pointers in the determination blocks of the channel elements of the second audio data stream, so that the determination blocks indicate as a beginning of the determination block audio data that the determination block audio data begin immediately after the respective determination block to obtain reset determination blocks;

changing a bit rate indication in the determination blocks of the channel elements of the second audio data stream so that a data block length depending on the bit rate indication according to the second audio file format is sufficient to take up the respective determination block and the associated determination block audio data to obtain bit rate-changed and reset determination blocks; and inserting bits between every channel element and the subsequent channel element, so that the length of every channel element plus the inserted bits is adapted to the changed bit rate indication, and a supplier for supplying the input data stream to the decoder according to the changed bit rate indication to obtain the audio signal.

14. A computer-readable medium having stored thereon a computer program with a program code for performing the method for converting a first audio data stream representing a coded audio signal comprising time periods and having a first file format into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, wherein determination block audio data are associated to the determination block, which are obtained by coding a time period, wherein the determination block comprises a pointer pointing to a beginning of the determination block audio data, and wherein and end of the determination block audio data lies prior to a beginning of determination block audio data in the audio data stream associated to a next data block, comprising the steps of:

combining the determination block audio data associated to a determination block of at least two data blocks to obtain contiguous determination block audio data forming part of the second audio data stream;

adding the contiguous determination block audio data to the determination block to which the determination block audio data are associated, from which the contiguous determination block audio data are obtained, to obtain a channel element;

arranging the channel elements to obtain the second audio data stream; and modifying the channel element so that the determination block thereof includes a length indication indicating the amount of data of the channel element or an amount of data of the contiguous determination block audio data, wherein the step of modifying comprises replacing a redundant part identical for all determination blocks by the length indication, when the computer program runs on a computer.

15. A computer-readable medium having stored thereon a computer program with a program code for performing the method for converting a first audio data stream representing a coded audio signal comprising time periods and having a first file format, into a second audio data stream representing the coded audio signal and having a second file format, wherein a time period comprises a number of audio values, and wherein, according to the first file format, the first audio data stream is divided into subsequent data blocks, wherein a data block comprises a determination block and data block audio data, comprising the step of:

modifying the data blocks so that the determination blocks thereof include a length indication indicating the amount of data of the data blocks or an amount of data of the data block audio data to obtain channel elements forming the second audio data stream from the data blocks, wherein the step of modifying includes replacing a redundant part identical for all determination blocks by the length indication, when the computer program runs on a computer.

16. A computer-readable medium having stored thereon a computer program with a program code for performing the method for decoding a second audio data stream representing a coded audio signal comprising time periods and having a second file format, based on a decoder, which is able to decode a first audio data stream representing the coded signal and having a first file format, into an audio signal, wherein a time period comprises a number of audio values, and wherein according to the first file format, the first audio data stream is divided into successive data blocks, wherein a data block has a determination block and data block audio data, wherein determination block audio data, which are obtained by coding a time period, are associated to the determination block, wherein the determination block includes a pointer pointing to a beginning of the determination block audio data, and wherein an end of the determination block audio data is prior to a beginning of determination block audio data in the audio data stream associated to a next data block, and wherein the second audio data stream is divided into channel elements according to the second file format, wherein a channel element comprises contiguous determination block audio data obtained by combining determination block audio data associated to a determination block from two data blocks, and the associated determination block in a form wherein a previously redundant part, which is identical for al determination blocks, is modified to be replaced by a length indication indicating the amount of data of the respective channel element or an amount of data of the respective contiguous determination block data, comprising the steps of:

forming an input data stream representing the coded audio signal and having a first file format, from the second audio data stream by parsing the second audio data stream by using the length indications;

resetting the pointers in the determination blocks of the channel elements of the second audio data stream, so that the determination blocks indicate as a beginning of the determination block audio data that the determination block audio data begin immediately after the respective determination block to obtain reset determination blocks;

changing a bit rate indication in the determination blocks of the channel elements of the second audio data stream so that a data block length depending on the bit rate indication according to the second audio file format is sufficient to take up the respective determination block and the associated determination block audio data to obtain bit rate-changed and reset determination blocks; and inserting bits between every channel element and the subsequent channel element, so that the length of every channel element plus the inserted bits is adapted to the changed bit rate indication, and supplying the input data stream to the decoder according to the changed bit rate indication to obtain the audio signal, when the computer program runs on a computer.

* * * * *